(12) United States Patent
Garg et al.

(10) Patent No.: US 12,502,425 B2
(45) Date of Patent: Dec. 23, 2025

(54) MULTIVALENT VIRUS LIKE PARTICLE VACCINES

(71) Applicant: Texas Tech University System, Lubbock, TX (US)

(72) Inventors: Himanshu Garg, Hatfield, PA (US); Anjali Joshi, Hatfield, PA (US)

(73) Assignee: Texas Tech University System, Lubbock, TX (US)

( * ) Notice: Subject to any disclaimer, the term of this patent is extended or adjusted under 35 U.S.C. 154(b) by 743 days.

(21) Appl. No.: 17/284,614

(22) PCT Filed: Oct. 17, 2019

(86) PCT No.: PCT/US2019/056645
§ 371 (c)(1),
(2) Date: Apr. 12, 2021

(87) PCT Pub. No.: WO2020/081759
PCT Pub. Date: Apr. 23, 2020

(65) Prior Publication Data
US 2022/0047691 A1 Feb. 17, 2022

Related U.S. Application Data

(60) Provisional application No. 62/746,681, filed on Oct. 17, 2018.

(51) Int. Cl.
*A61K 39/12* (2006.01)
*C07K 14/005* (2006.01)
(Continued)

(52) U.S. Cl.
CPC ............ *A61K 39/12* (2013.01); *C07K 14/005* (2013.01); *C12N 15/86* (2013.01);
(Continued)

(58) Field of Classification Search
None
See application file for complete search history.

(56) References Cited

U.S. PATENT DOCUMENTS

2006/0200869 A1 9/2006 Naldini et al.
2018/0177859 A1 6/2018 Galarza et al.
(Continued)

FOREIGN PATENT DOCUMENTS

WO 2018/152526 A1 8/2018
WO WO 2018/152526 * 8/2018

OTHER PUBLICATIONS

UniProt db access No. W8FJT0_9FLAV 2014 alignment with instant Seq Id No. 1.*
(Continued)

*Primary Examiner* — Shanon A. Foley
(74) *Attorney, Agent, or Firm* — Edwin S. Flores; Daniel J. Chalker; Chalker Flores, LLP

(57) ABSTRACT

The present invention includes composition and methods for making multivalent vaccines for immunization against Flavivirus and/or arboviruses including a multivalent Virus Like Particles (VLP) and mixtures thereof, the method comprising: method of making a Flavivirus and/or arboviruses Virus Like Particles (VLP) comprising: inserting two or more nucleic acids that encode at least one Flavivirus protein into a lentiviral backbone vector; generating a lentivirus by transfecting a first cell line with the lentiviral backbone vector and isolating the lentivirus therefrom; transducing a second cell line with the lentivirus; culturing the transduced cell line under conditions in which the multivalent Flavivirus Virus Like Particles (VLP) are released from the cell line; and isolating the Flavivirus Virus Like Particles (VLP) from a culture supernatant, wherein a cell line makes a virus-specific VLP, and the VLPs are
(Continued)

purified and then mixed in different combinations to make the multivalent vaccine.

22 Claims, 21 Drawing Sheets

Specification includes a Sequence Listing.

(51) Int. Cl.
  *C12N 15/86* (2006.01)
  *A61K 39/00* (2006.01)
(52) U.S. Cl.
  CPC ...... *A61K 2039/70* (2013.01); *C12N 2740/15023* (2013.01); *C12N 2740/15043* (2013.01); *C12N 2770/24122* (2013.01); *C12N 2770/24123* (2013.01); *C12N 2770/24134* (2013.01)

(56) References Cited

U.S. PATENT DOCUMENTS

| | | | |
|---|---|---|---|
| 2019/0083601 A1* | 3/2019 | Tauber | C12N 7/00 |
| 2022/0047691 A1* | 2/2022 | Garg | C12N 15/86 |

OTHER PUBLICATIONS

UniProt db access No. A0A119RH28_9FLAV 2017 alignment with instant Seq Id No. 5.*

UniProt db access No. A0A0D5MAW7_CHIKV 2015 alignment with instant Seq Id No. 7.*

Vasilakis and Weaver (Current Opinion in Virology. 2017; 22: 30-35).*

Boigard et al. "Zika virus-like particle (VLP) based vaccine," PLoS Negl Trop Dis, May 8, 2017 (May 8, 2017), vol. 11, e0005608, pp. 1-20.

De Wispelaere et al. "A Lentiviral Vector Expressing Japanese Encephalitis Virus-like Particles Elicits Broad Neutralizing Antibody Response in Pigs," PLoS Negl Trop Dis, Oct. 5, 2015 (Oct. 5, 2015), vol. 9, e0004081, pp. 1-20.

"FreeStyle™ 293-F Cells: User Guide," ThermoFisher, Jun. 7, 2017 (Jun. 27, 2017), pp. 1-2. Retrieved from the Internet:<https://assets.thermofisher.com/TFS-Assets/LSG/manuals/MAN0007834-FreeStyle293-F-Cell-UG.pdf> on Dec. 20, 2019 (Dec. 20, 2019).

Garg et al. "Development of Virus-Like-Particle Vaccine and Reporter Assay for Zika Virus," J Virol, Sep. 27, 2017 (Sep. 27, 2017), vol. 91, e00834-17, pp. 1-16.

Garg et al. "Capsid containing virus like particle vaccine against Zika virus made from a stable cell line," Vaccine, Oct. 10, 2019 (Oct. 10, 2019), vol. 37, pp. 7123-7131.

Ooi et al. "A Guide to Transient Expression of Membrane Proteins in HEK-293 Cells for Functional Characterization," Front Physiol, Jul. 19, 2016 (Jul. 19, 2016), vol. 7, pp. 1-15.

International Search Report, PCT/US2019/056645 [ISA/US] dated 16 Jan. 16, 2020.

* cited by examiner

RESTRICTION ENZYME SITES

RESTRICTION ENZYME SITES

ZIKA NS2B3

FLAVIVIRAL STRUCTURAL PROTEINS

C — prM — E — IRES — NS2B-3

0                                    1248

LENTIVIRAL VECTOR WITH SELECTION MARKER

293T-JEV-Lenti

FIG. 1B

4G2         Bright Field

293T-JEV-Lenti

Control

FIG. 2B
293-YFV-Lenti

FIG. 3A

FIG. 3B
293T-CHKV-Lenti

| SAMPLE NAME | MEAN: FL1-A |
|---|---|
| CHIKV LENTI CELL LINES 293 UNSTAINED 00005526 542.LMD | 476 |
| CHIKV LENTI CELL LINES 293 CHIKV 00005525 541.LMD | 2629 |
| CHIKV LENTI CELL LINES CLONE CH-6 00005521 537.LMD | 18307 |
| CHIKV LENTI CELL LINES CLONE CH-3 00005528 544.LMD | 43722 |
| CHIKV LENTI CELL LINES CLONE CH-2 00005522 538.LMD | 12521 |
| CHIKV LENTI CELL LINES CLONE CG-10 00005527 543.LMD | 23979 |
| CHIKV LENTI CELL LINES CLONE CF-5 00005520 536.LMD | 17417 |
| CHIKV LENTI CELL LINES CLONE CF-1 00005523 539.LMD | 2449 |
| CHIKV LENTI CELL LINES BULK 00005524 540.LMD | 15544 |

CHKV-Lenti: C | E3 | E2 | 6K | E1

CHKV

FIG. 9C

JEV

| CLONE | MFI |
|---|---|
| CELLS ONLY | 453 |
| 293T-4G2 | 2676 |
| JD12 | 33851 |
| JF10 | 50024 |
| JE10 | 57075 |
| JG7 | 54074 |
| JG3 | 53597 |

FIG. 10A

YFV

| CLONE | MFI |
|---|---|
| CELLS ONLY | 366 |
| 293T-4G2 | 3427 |
| YE1 | 20852 |
| YE9 | 24625 |
| YF4 | 11152 |
| YF6 | 19874 |
| YF9 | 18807 |
| BULK | 9166 |

FIG. 10B

CHKV

| CLONE | MFI |
|---|---|
| CELLS ONLY | 464 |
| 293T-E ab | 2555 |
| CF5 | 17104 |
| CG10 | 22783 |
| CH3 | 42204 |
| CH6 | 17929 |
| BULK | 15163 |

FIG. 10C

| GROUP | INJECTION | ROUTE | VOLUME | AMOUNT |
|---|---|---|---|---|
| 1 | ZIKA | i.m. | 100 μl | 1:1 MIX WITH ALUM |
| 2 | JEV | i.m. | 100 μl | 1:1 MIX WITH ALUM |
| 3 | YFV | i.m. | 100 μl | 1:1 MIX WITH ALUM |
| 4 | CHKV | i.m. | 100 μl | 1:1 MIX WITH ALUM |
| 5 | JEV+CHKV | i.m. | 100 μl | 1:1 MIX WITH ALUM |
| 6 | YFV+CHKV | i.m. | 100 μl | 1:1 MIX WITH ALUM |
| 7 | ZIKV+YFV+CHKV+JEV | i.m. | 100 μl | 1:1 MIX WITH ALUM |
| 8 | PBS | i.m. | 100 μl | 1:1 MIX WITH ALUM |

MULTIVALENT VIRUS LIKE PARTICLE VACCINES

CROSS-REFERENCE TO RELATED APPLICATIONS

This application claims priority to and is the National Stage of International Application No. PCT/US2019/056645, filed on Oct. 17, 2019 and claims priority to U.S. Provisional Application Ser. No. 62/746,681, filed Oct. 17, 2018, the entire contents of which are incorporated herein by reference.

STATEMENT OF FEDERALLY FUNDED RESEARCH

Not Applicable.

TECHNICAL FIELD OF THE INVENTION

The present invention relates in general to the field of vaccines, and more particularly, to novel multivalent vaccines for arboviruses.

INCORPORATION-BY-REFERENCE OF MATERIALS FILED ON COMPACT DISC

The present application includes a Sequence Listing which has been submitted in ASCII format via EFS-Web and is hereby incorporated by reference in its entirety. Said ASCII copy, created on Oct. 15, 2019, is named TECH2132WO_SeqList.txt and is 46, kilo bytes in size.

BACKGROUND OF THE INVENTION

Without limiting the scope of the invention, its background is described in connection with arboviruses, alphaviruses, and Flaviviruses.

Arboviruses derive their name from the original manner in which they were identified and cataloged, namely, the commonality that they were transmitted via arthropod vectors. The name Arbovirus is an acronym for, ARthropod-BOrne virus. Arboviruses viruses have a typical incubation period of 3-15 days, and the infection is typically resolved in 3-7 days. The most common symptoms of an Arbovirus infection is fever, headache, malaise and in certain cases encephalitis or hemorrhagic fever. Chikungunya virus is an alphavirus that is part of the larger group of Arboviruses.

*Flavivirus* is a genus of viruses in the family Flaviviridae, which derive their name from the Latin work for yellow (flavus) and are characterized by the jaundice that accompanies infection with the first recognized members of this genus. The *Flavivirus* genus includes the Zika virus, Yellow Fever Virus, Japanese Encephalitis Virus, Dengue 1-4 Viruses, Tick Borne Encephalitis Virus, West Nile Virus, St. Louis Encephalitis Virus, and others. *Flaviviruses* are also Arboviruses.

It is known that Arboviruses have the tendency to co-circulate in similar geographical areas due to prevalence of conducive eco-epidemiological factors in tropical and sub-tropical countries. One of the key factors contributing to this prevalence is the occurrence of multiple vectors in an area capable of transmitting different diseases or the same vector capable of transmitting different pathogens. In this regard, countries with prevalent Zika virus (ZIKV) infection include Africa, Asia, Caribbean, Central, North, and South America and the Pacific Islands. Japanese Encephalitis Virus (JEV) infections are prevalent in almost all Asian countries. The Yellow Fever Virus (YFV) is found in tropical and subtropical areas of Africa and South America. Chikungunya virus (CHKV) cases and outbreaks have been identified in countries in Africa, Asia, Europe, Indian and Pacific Oceans, Mexico and North and South America. Thus there is a need for tailored multivalent arboviral vaccines depending on: (1) the geographical area that includes the components as per the prevalence of disease in a particular country/region, (2) members actively serving in the military and could be deployed to different geographical regions depending on need; and (3) pregnant women who are at risk or immunocompromised individuals that may be more prone to certain disease when compared to immunocompetent adults.

Thus, a need remains for the development of vaccines against members of the *Flavivirus* and/or Arbovirus families that provide robust immunity.

SUMMARY OF THE INVENTION

In one embodiment, the present invention includes a nucleic acid encoding two or more consensus, code optimized, or both consensus and codon optimized, multivalent *Flavivirus* nucleic acid sequences that express one or more *Flavivirus* and/or arbovirus proteins inserted into a lentiviral vector capable of forming Virus Like Particles (VLPs). In one aspect, a cell line makes a virus-specific VLP, and the virus-specific VLPs are purified and then mixed in different combinations to make a multivalent vaccine. In another aspect, the nucleic acids are selected from at least one of nucleic acid SEQ ID NOS:2, 6, or 8. In another aspect, the two or more nucleic acids are inserted into the lentiviral vector. In another aspect, the nucleic acid express two or more proteins selected from SEQ ID NO:1, 5, or 7. In another aspect, the nucleic acid is transfected into a cell line. In another aspect, the nucleic acid is transfected into a human cell line. In another aspect, the nucleic acid is transfected into a 293T cell line. In another aspect, the nucleic acid is stably transduced in a cell line. In another aspect, the *Flavivirus* proteins are selected from at least one of: Zika virus, Yellow Fever Virus, Japanese Encephalitis Virus, Dengue1-4 Virus, Tick Borne Encephalitis Virus, West Nile Virus, St Louis Encephalitis Virus.

In another embodiment, the present invention includes a method of making a multivalent arbovirus Virus Like Particles (VLP) comprising: inserting two or more nucleic acids that encode at least one arbovirus protein into a lentiviral backbone vector; generating a lentivirus by transfecting a first cell line with the lentiviral backbone vector and isolating the lentivirus therefrom; transducing a second cell line with the lentivirus; culturing the transduced cell line under conditions in which the multivalent arbovirus Virus Like Particles (VLP) are released from the cell line; and isolating the multivalent arbovirus Virus Like Particles (VLP) from a culture supernatant. In one aspect, a cell line makes a virus-specific VLP, and the virus-specific VLPs are purified and then mixed in different combinations to make a multivalent vaccine. In another aspect, the nucleic acids are selected from at least one of nucleic acid SEQ ID NOS:2, 6, or 8. In another aspect, the nucleic acid is a consensus, a codon optimized, or both a consensus and codon optimized nucleic acid and expresses one or more proteins of SEQ ID NO:1, 5, or 7. In another aspect, the first, the second, or both the first and second cell line is a human cell line. In another aspect, the first, the second, or both the first and second cell line is a 293T cell line. In another aspect, the method further comprises generating two or more VLPs that express proteins from different arboviruses and/or *Flaviviruses*, express proteins from different *Flavivirus* strains, or express proteins from different *Flavivirus* clades, wherein each of the VLPs is made in a different cell lines and a vaccine is prepared by mixing the different VLPs produced by different transduced cell lines. In another aspect, the mix of VLPs from different transduced cell lines into region-specific multivalent vaccines, wherein a ratio of different arbovirus VLPs is prepared based on the most prevalent arbovirus for such a region. In another aspect, the mix of VLPs is bivalent, trivalent, or tetravalent. In another aspect, the mix of VLPs from different transduced cell lines into region-specific multivalent vaccines is the following: immunization for a worldwide, a travel, or a military use: Zika, JEV, YFV and Chikungunya virus (CHIKV) (which is an arbovirus), or YFV and JEV; for an Asia or Australia JEV, CHIKV and Zika; for a South America or Africa: YFV, CHIKV and Zika; or for a pacific region: JEV, CHIKV and Zika.

In another embodiment, the present invention includes a vaccine comprising an isolated and purified multivalent arbovirus Virus Like Particles (VLP) that comprises at least one structural protein from viruses selected from Japanese Encephalitis Virus (JEV), Chikungunya virus (CHIKV) (which is an arbovirus), Yellow Fever Virus (YFV), and Zika virus, wherein the vaccine is a combination of two or more different VLPs from two or more *Flaviviruses* and/or arboviruses. In one aspect, a cell line transduced with a lentiviral vector that makes a virus-specific VLP, and the virus-specific VLPs are purified and then mixed in different combinations to make a multivalent vaccine. In another aspect, the vaccine is optimized for immunization worldwide, Asia and Australia, South America and Africa, or Pacific Region. In another aspect, the vaccine is bivalent, trivalent or tetravalent for a *Flavivirus* selected from at least one of: Zika virus, Yellow Fever Virus, Japanese Encephalitis Virus, Dengue1-4 Virus, Tick Borne Encephalitis Virus, West Nile Virus, St Louis Encephalitis Virus. In another aspect, the mix of VLPs from different transduced cell lines into region-specific multivalent vaccines is the following: immunization for a worldwide, a travel, or a military use: Zika, JEV, YFV and CHIKV, or YFV and JEV; for an Asia or Australia JEV, CHIKV and Zika; for a South America or Africa: YFV, CHIKV and Zika; or for a pacific region: JEV, CHIKV and Zika. In another aspect, the vaccine further comprises one or more vaccines selected from at least one of: influenza A vaccine, an influenza B vaccine, an influenza A (H1N1) vaccine, a hepatitis A vaccine, a hepatitis B vaccine, a *Haemophilus influenzae* Type B (HiB) vaccine, a measles vaccine, a mumps vaccine, a rubella vaccine, a polio vaccine, a human papilloma virus (HPV) vaccine, a tetanus vaccine, a diptheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

In another embodiment, the present invention includes a cell line transformed with a nucleic acid vector comprising a nucleic acid sequence that is a consensus, a codon optimized, or both a consensus and codon optimized nucleic acid that encodes one or more multivalent *Flavivirus* and/or arbovirus proteins in a lentiviral vector. In one aspect, the one or more multivalent *Flavivirus* and/or arbovirus proteins are expressed by a nucleic acid sequence codon optimized for expression in human cells. In another aspect, the one or more multivalent *Flavivirus* proteins are expressed by a nucleic acid sequence codon optimized for expression in human cells of SEQ ID NO:2, 6, or 8. In another aspect, the one or more multivalent *Flavivirus* proteins have the amino acid sequence of SEQ ID NO:1, 5, or 7. In another aspect, the cell line is stably transfected with the nucleic acid vector.

In another embodiment, the present invention includes a purified multivalent *Flavivirus* Virus Like Particles (MV-VLP) comprising the two or more proteins selected from different *Flaviviruses* and the two or more proteins are from a portion of amino acid sequences SEQ ID NO:1, 5, or 7. In one aspect, a cell line transduced with a lentiviral vector that makes a virus-specific VLP, and the virus-specific VLPs are purified and then mixed in different combinations to make a multivalent vaccine. In another aspect, the MV-VLPs are produced in a stably transduced cell line. In another aspect, the MV-VLPs are produced in a stably transduced human cell line. In another aspect, the MV-VLPs are produced in a stably transduced 293T cell line. In another aspect, the MV-VLPs are isolated from at least one of: a culture supernatant, or the cell lines. In another aspect, the purified MV-VLP further comprises one or more vaccines selected from at least one of: influenza A vaccine, an influenza B vaccine, an influenza A (H1N1) vaccine, a hepatitis A vaccine, a hepatitis B vaccine, a *Haemophilus influenzae* Type B (HiB) vaccine, a measles vaccine, a mumps vaccine, a rubella vaccine, a polio vaccine, a human papilloma virus (HPV) vaccine, a tetanus vaccine, a diptheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

In another embodiment, the present invention includes an immunogenic composition comprising at least one codon optimized multivalent Virus Like Particles (VLP) that comprises at least one structural protein from two or more viruses selected from Japanese Encephalitis Virus (JEV), Chikungunya virus, Yellow Fever Virus (YFV), and Zika virus. In one aspect, a cell line transduced with a lentiviral vector that makes a virus-specific VLP, and the virus-specific VLPs are purified and then mixed in different combinations to make a multivalent vaccine. In another aspect, the immunogenic composition further comprises an adjuvant. In another aspect, the composition comprises at least two VLPs comprising different *Flavivirus* E proteins.

In another embodiment, the present invention includes a method of generating an immune response to one or more *Flaviviruses* in a subject, the method comprising administering to the subject an effective amount of an immunogenic composition comprising at least one codon optimized multivalent *Flavivirus* Virus Like Particles (VLP) that comprises at least one structural protein from two or more *Flaviviruses* selected from Zika virus, Yellow Fever Virus, Japanese Encephalitis Virus, Dengue1-4 Virus, Tick Borne Encephalitis Virus, West Nile Virus, or St Louis Encephalitis Virus. In one aspect, a cell line transduced with a lentiviral vector that makes a virus-specific VLP, and the virus-specific VLPs are purified and then mixed in different combinations to make a multivalent vaccine. In another aspect, the composition is administered mucosally, intradermally, subcutaneously, intramuscularly, or orally. In another aspect, the immune response vaccinates the subject against multiple serotypes or clades of one or more *Flaviviruses*. In another aspect, the subject is a human. In another aspect, the method further comprises one or more vaccines selected from at least one of: influenza A vaccine, an influenza B vaccine, an influenza A (H1N1) vaccine, a hepatitis A vaccine, a hepatitis B vaccine, a *Haemophilus influenzae* Type B (HiB) vaccine, a measles vaccine, a mumps vaccine, a rubella vaccine, a polio vaccine, a human papilloma virus (HPV) vaccine, a tetanus vaccine, a diptheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine. In another aspect, the composition is administered in a multiple dose schedule. In another aspect, the VLP further comprises antigens from Chikungunya virus.

In another embodiment, the present invention includes a nucleic acid vector comprising a lentiviral vector comprising one or more engineered restriction nuclease sites and a codon optimized Zika virus NC2B-3 protein downstream from an internal ribosomal entry site (IRES), wherein a *Flaviviral* insert comprising one or more *Flavivirus* protein sequences can be inserted into the vector at the restriction sites, wherein the vector produces a purified multivalent *Flavivirus* Virus Like Particles (MV-VLP) when in a cell.

BRIEF DESCRIPTION OF THE DRAWINGS

For a more complete understanding of the features and advantages of the present invention, reference is now made to the detailed description of the invention along with the accompanying figures and in which:

FIGS. 1A to 1C show as follows. FIG. 1A shows a schematic of a Universal Lentiviral vector for generating cell lines secreting *Flavivirial* VLPs. Restriction sites introduced on either side of structural protein allow easy swapping of the structural proteins of any *Flavivirus* including but not limited to Zika, Yellow Fever Virus, Japanese Encephalitis Virus, Dengue1-4 Virus, Tick Borne Encephalitis Virus, West Nile Virus, St Louis Encephalitis Virus etc., and includes an downstream from an internal ribosomal entry site (IRES), and a codon optimized Zika NS2B3 Protein sequence with a Tag. FIG. 1B shows culture supernatants were harvested from 293T cell line stably expressing the JEV CprME (293T-JEV-Lenti) and analyzed for E protein expression by western blotting using specific antibody. FIG. 1C shows 293T-JEV-Lenti or control 293T cells were stained for E protein expression using the pan *Flaviviral* 4G2 monoclonal antibody followed by fluorescence microscopy.

FIGS. 2A and 2B show as follows. FIG. 2A shows a schematic of a lentiviral vector expressing Yellow Fever Virus (YFV) CprME along with the protease NS2B-3 for production of capsid containing virus like particles. FIG. 2B shows supernatants harvested from a 293T cell line stably expressing the YFV CprME proteins in the presence of the NSB2-3 protease that is required for release of VLPs from cells. Expression of E protein was analyzed by western blotting using specific antibodies. Lanes 1 and 2 represent supernatants harvested at different days of culture and C represents Control supernatants from 293Y cells. M-molecular weight.

FIG. 3A is a schematic of a lentiviral vector expression that includes CHKV structural proteins for production of capsid containing virus like particles. FIG. 3B is a Western Blot showing the culture supernatants harvested from 293T cells stably transfected and expressing the CHKV structural proteins (293T-CHKV-Lenti) and analyzed for CHKV E1-E2 protein expression.

FIGS. 7A to 7D show a strategy for JEV, YFV, Zika and CHIKV RVP generation and titration.

FIGS. 9A to 9C show the generation and characterization of bicistronic lentiviral vectors expressing *Flaviviral* structural proteins.

FIGS. 10A to 10C show the generation of stable cell lines secreting JEV, YFV and CHKV VLPs.

Figures 13A, 13B:
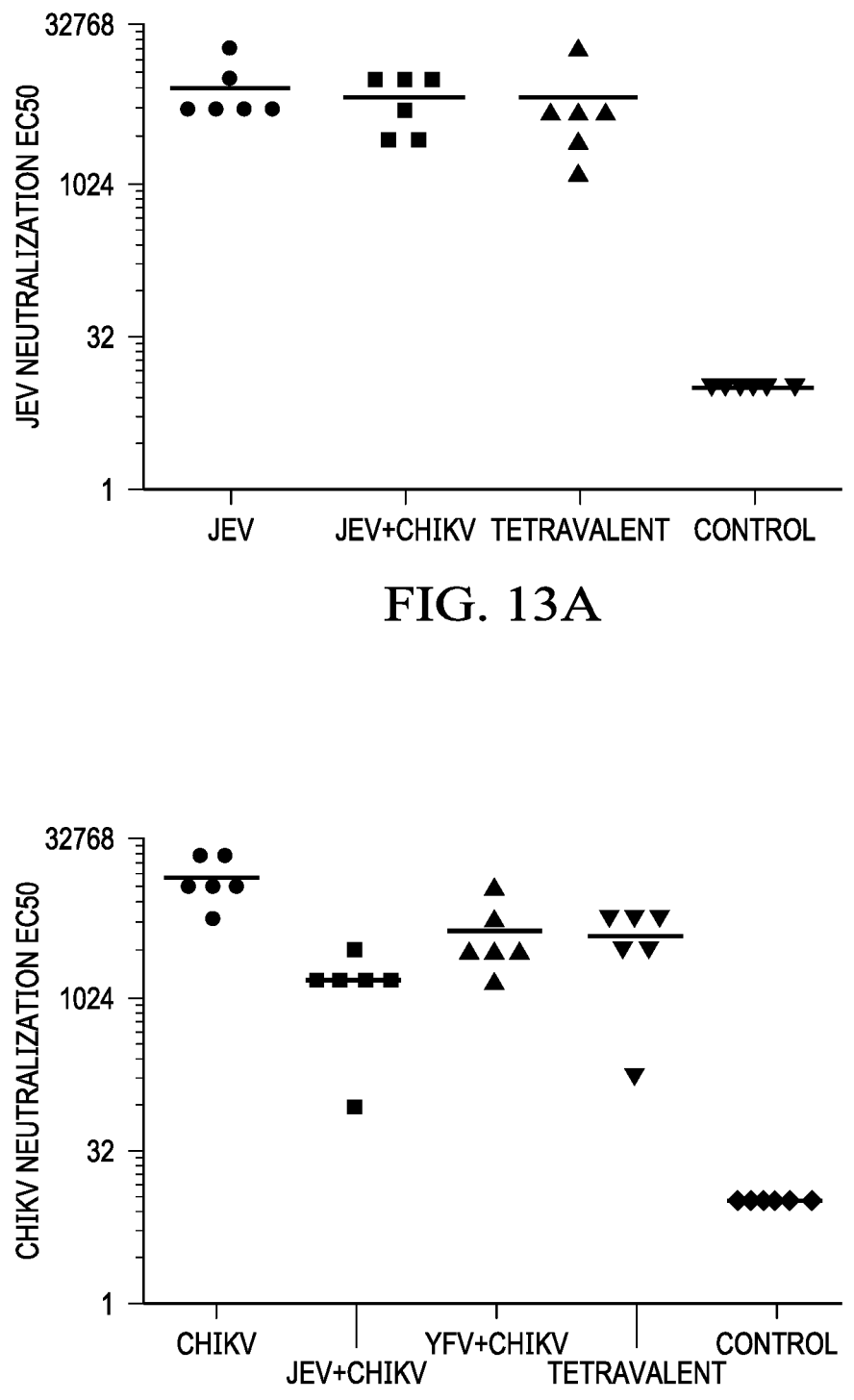

FIGS. 13A to 13D show the neutralization efficacy of VLP vaccine combinations.

FIGS. 14A to 14D show the quality of antibody response generated in VLP immunized mice.

DETAILED DESCRIPTION OF THE INVENTION

Figure 4A:
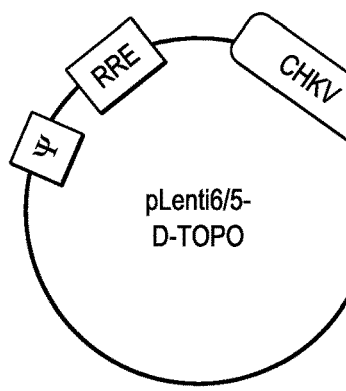
FIGS. 4A and 4B show the establishment of a single cell clones expressing CHKV Structural proteins.
Figure 4A:
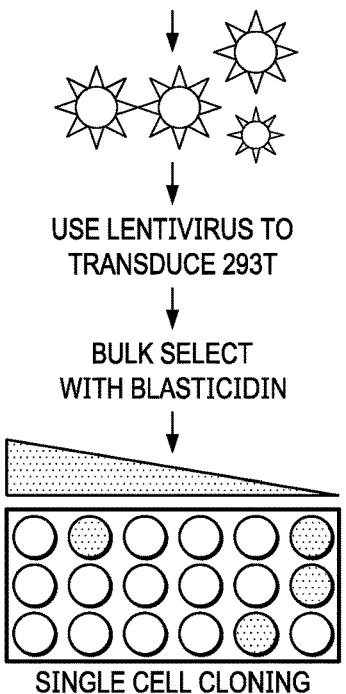

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes a multivalent vaccine that forms Virus Like Particles (VLPs) in a cell line that stably produces multivalent arbovirus VLPs. Arbovirus virus genomes were cleaved to express the capsid (C), pre-membrane (PrM), envelope (E), and other non-structural proteins, none of which are capable of generating host infections, but are still able to elicit an immune response. These multivalent arbovirus VLPs were then coupled with the backbone of a West Nile virus (WNV) reporter gene, to generate reporter virus-like particles, which can be detected by luciferase assays, and when used as a vaccine, were able to trigger the production of a robust immune response in animals. The antibodies elicited were further shown to be neutralizing antibodies against multivalent arbovirus vaccine. The multivalent arbovirus VLP of the present invention includes combinations of, e.g., Japanese Encephalitis Virus, Chikungunya Virus (an arbovirus), Yellow Fever Virus, and/or Zika Virus in a single vaccine. The vaccine can be further customized for use in certain areas of the world where a subset of Arboviruses are more prevalent, thus providing customized immunity in those regions with the specific need for a specific need of immunity against certain *Flaviviruses* and/or Arboviruses.

As used throughout the present specification the following abbreviations are used: TF, transcription factor; ORF, open reading frame; kb, kilobase (pairs); UTR, untranslated region; kD, kilodalton; PCR, polymerase chain reaction; RT, reverse transcriptase.

The term "gene" is used to refer to a functional protein, polypeptide or peptide-encoding unit. As will be understood by those in the art, this functional term includes both genomic sequences, cDNA sequences, or fragments or combinations thereof, as well as gene products, including those that may have been altered by the hand of man. Purified genes, nucleic acids, protein and the like are used to refer to these entities when identified and separated from at least one contaminating nucleic acid or protein with which it is ordinarily associated.

As used herein, the term "vector" is used in reference to nucleic acid molecules that transfer DNA segment(s) from one cell to another. The vector may be further defined as one designed to propagate multivalent arbovirus Virus Like Particle sequences, or as an expression vector that includes a promoter operatively linked to the multivalent *Flavivirus* and/or arbovirus Virus Like Particle sequence, or one designed to cause such a promoter to be introduced. The vector may exist in a state independent of the host cell chromosome, or may be integrated into the host cell chromosome.

The term "host cell" refers to cells that have been engineered to contain nucleic acid segment that encodes a multivalent arbovirus Virus Like Particle, or altered segments, whether archeal, prokaryotic, or eukaryotic. Thus, engineered, or recombinant cells, are distinguishable from naturally occurring cells that do not contain recombinantly introduced genes through the hand of man.

As used herein, the terms "polynucleotide", "nucleic acid sequence", "nucleotide sequence", or "nucleic acid fragment" are used interchangeably and is a polymer of RNA or DNA that is single- or double-stranded, optionally containing synthetic, non-natural or altered nucleotide bases. Nucleotides (usually found in their 5'-monophosphate form) are referred to by their single letter designation as follows: "A" for adenylate or deoxyadenylate (for RNA or DNA, respectively), "C" for cytidylate or deoxycytidylate, "G" for guanylate or deoxyguanylate, "U" for uridylate, "T" for deoxythymidylate, "R" for purines (A or G), "Y" for pyrimidines (C or T), "K" for G or T, "H" for A or C or T, "I" for inosine, and "N" for any nucleotide.

As used herein, the term "isolated" refers to materials, such as nucleic acid molecules and/or proteins that are substantially free or otherwise removed from components that normally accompany or interact with the materials in a naturally occurring environment.

The present invention can also be combined with other approved vaccines, including, but not limited to, one or more antigens from a pathogen selected from: *Haemophilus influenzae* b, *Neisseria meningitidis* type A, *Neisseria Meningitidis* type C, *Neisseria meningitidis* type W, *Neisseria meningitidis* type Y, *Neisseria meningitidis* type X, *Neisseria meningitidis* type B, *Streptococcus pneumoniae*, *Streptococcus agalactiae, Salmonella typhi*, Hepatitis A, Hepatitis B, RSV, Hepatitis C, diphtheria toxoid, tetanus toxoid, whole cell pertussis, acellular pertussis, *Staphylococcus aureus*, anthrax, *Vibrio cholera*, Zika, Ebola, Chikungunya, dengue, malaria, measles, mumps, rubella, BCG, Japanese encephalitis, Rotavirus, smallpox, Shigella, yellow fever, typhoid, CMV, Shingles, Varicella virus, HPV, HSV, and HIV. The multivalent arbovirus Virus Like Particles and variants of the present invention can be formulated into a single vaccine with other vaccines, e.g., an influenza A vaccine, an influenza B vaccine, an influenza A (H1N1) vaccine, a hepatitis A vaccine, a hepatitis B vaccine, a *Haemophilus influenzae* Type B (HiB) vaccine, a measles vaccine, a mumps vaccine, a rubella vaccine, a polio vaccine, a human papilloma virus (HPV) vaccine, a tetanus vaccine, a diptheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

The multivalent arbovirus Virus Like Particles and variants of the present invention may contain alterations in the coding regions, non-coding regions, or both. Polynucleotide variants can be produced for a variety of reasons, e.g., to optimize codon expression for a particular host (change codons in the human mRNA to those preferred by a bacterial host such as *E. coli*), as is the case in certain embodiments of the present invention and which are known to those of skill in the art following, e.g., Sambrook and Russell, Molecular Cloning 3rd Ed. Cold Spring Harbor Laboratory Press, Cold Spring Harbor N.Y. 5 (2001) and by Ausubel et al., Current Protocols In Molecular Biology, John Wiley and Sons, Inc. (1998), and updates thereof.

Virus Like Particle (VLP) based vaccines fare superior to other vaccine platforms. For instance, Purified Inactivated Virus (PIV) vaccines bear the caveat of incomplete inactivation and handing large volumes of infectious virus, while live attenuated vaccines (LAVs) pose a safety challenge for administration in pregnant women and immunocompromised individuals. VLP based vaccines are safe to use in children and immunocompromised individuals due to their non-infectious nature, yet they are more immunogenic than purified viral proteins. As the structure of VLPs closely resemble the native virus particle, the antigens recognized by the immune system bear greater resemblance to a natural infection generating an effective immune response Moreover, generation of stable cell lines producing VLPs provides a safe, viable and economical vaccine platform that can be scaled for worldwide use especially in developing and underdeveloped countries where the risk of arboviral infections remains high.

The nature of the Virus Like particle (VLP) vaccine of the present invention makes it ideal to develop as a mono, di, tri or tetravalent vaccine formulation depending on need. As each VLP vaccine is produced individually via a unique stable cell line, there is an opportunity to not only regulate the dose of each VLP in the vaccine but also tailor the combination vaccine as per need. For instance, the tetravalent formulation containing all 4 VLPs would be ideal for administration in pregnant women and Military in the US and worldwide. A trivalent formulation containing Japanese Encephalitis Virus (JEV), Chikungunya virus, Yellow Fever Virus (YFV), and Zika virus would be ideal for the general population in Asia while a trivalent formulation containing JEV, YFV, CHIKV and Zika would be optimal for vaccination of the general population in South America (Table 2). Moreover, different monovalent and bivalent vaccine combinations depending on the geographical area are also recommended (Table 1). Tables 1 and 2 below list the vaccine combinations depending on the geographical region and the target population.

TABLE 1

Different vaccine combinations depending on the geographical region.

| Vaccine | VLPs | Region |
| --- | --- | --- |
| Monovalent | Zika | Worldwide |
| Monovalent | JEV | Asia, Australia |

TABLE 1-continued

Different vaccine combinations depending on the geographical region.

| Vaccine | VLPs | Region |
|---|---|---|
| Monovalent | CHIKV | Worldwide |
| Monovalent | YFV | South America, Africa |
| Bivalent | JEV + YFV | Pacific region |
| Bivalent | Zika + JEV | Asia, Australia |
| Bivalent | Zika + YFV | South America, Africa |
| Bivalent | Zika + CHIKV | South America, Africa |
| Bivalent | JEV + CHIKV | Asia, Australia |
| Bivalent | YFV + CHIKV | South America, Africa |
| Trivalent | Zika + YFV + CHIKV | South America, Africa |
| Trivalent | Zika + JEV + CHIKV | Asia, Australia |
| Tetravalent | Zika + JEV + CHIKV + YFV | Worldwide |

TABLE 2

Different vaccine combinations depending on the target population.

| Target population | Vaccine version | VLPs included | Geographical region |
|---|---|---|---|
| Pregnant women | Tetravalent | Zika, JEV, YFV and CHIKV | US, Worldwide |
| US Military | Tetravalent | Zika, JEV, YFV and CHIKV | US, Worldwide |
|  | Bivalent | YFV, JEV | US military, Pacom |
| General population Asia | Trivalent | JEV, CHIKV and Zika | Asia, Australia |
| General population Africa | Trivalent | YFV, CHIKV and Zika | Africa |
| General population South America | Trivalent | YFV, CHIKV and Zika | South America |
| US Travelers | Tetravalent | Zika, JEV, YFV and CHIKV | Worldwide |

A universal Lentiviral Vector for generating cell lines secreting *Flaviviral* VLPs. FIG. 1A show a Lentiviral vector for generating cell lines secreting Flavivirial VLPs that includes certain unique features. Restriction sites introduced on either side of structural protein allow easy swapping of the structural proteins of any *Flavivirus* including but not limited to Zika, Yellow Fever Virus, Japanese Encephalitis Virus, Dengue1-4 Virus, Tick Borne Encephalitis Virus, West Nile Virus, St Louis Encephalitis Virus etc. Further, a codon optimized Zika NS2B3 sequence with an IRES sequence between the structural proteins and NS2B3.

Example I. Stable Cell Lines Secreting Capsid Containing Japanese Encephalitis Virus (JEV) Virus Like Particles (VLP) For Vaccine Use Japanese Encephalitis (JE) is one the most important vector borne viral disease affecting Asian countries. It is estimated that 67900 cases of JE are seen every year in 24 JE endemic countries. Overall in these countries 2.6 billion people are at risk for JE. Although a vaccine for JE is available the cost and effectiveness of the vaccine makes it out of reach for most people. This is validated by the occurrence of approximately 55000 new cases of JE in areas with a vaccination program (WHO Bulletin). The current vaccine is also contraindicated in pregnant women.

The current approved vaccine for JEV is a purified inactivated virus vaccine (PIV). The immunogenicity, cost of production and safety of PIV vaccines is often limited. Virus like particles (VLP) on the other hand provide a cheaper, safer and more effective Vaccine platform for many viral diseases. The success of the VLP vaccine against Papilloma virus (HPV) exemplifies the success of this platform.

Currently there are no VLP vaccines against JEV approved for human use. Previous attempts to make JEV VLPs did not include the capsid protein, thereby limiting immunogenicity. The inventors have developed a capsid containing VLP platform for JEV related Zika virus and shown that this platform can provide an economical, safe and highly effective vaccine for use in humans. Our technology is built on three main innovations.

The present inventors have developed a vector system in which the structural proteins of JEV (CprME) are coexpressed with a Zika NS2B3 protein via a single vector by utilizing IRES sequence upstream for the NS2B3 coding region. The VLP platform produces Capsid containing VLPs that provide better immune response.

A consensus sequence of 158 published JEV sequences from year 2000 onwards was generated. The consensus sequence was then converted into the consensus sequence translation that is codon optimized for high expression of the proteins. The codon optimized vector is then used to produce a VLP that provide a vaccine that is most relevant to current outbreaks. Use a lentiviral system to generate stable cell lines that constitutively express JEV CprME VLP and secrete the same in the supernatant. Optimize production and purification is optimized for the VLPs from these stable cell lines.

Japanese Encephalitis Consensus Sequences used in the vaccine, amino acid sequence (SEQ ID NO:1):

```
MTKKPGGPGKNRAINMLKRGLPRVFPLVGVKRVVMSLLDGRGPVRFVLAL
ITFFKFTALAPTKALLGRWKAVEKSVAMKHLTSFKRELGTLIDAVNKRGR
KQNKRGGNEGSIMWLASLAVVIACAGAMKLSNFQGKLLMTINNTDIADVI
VIPTSKGENRCWVRAIDVGYMCEDTITYECPKLTMGNDPEDVDCWCDNQE
VYVQYGRCTRTRHSKRSRRSVSVQTHGESSLVNKKEAWLDSTKATRYLMK
TENWIIRNPGYAFLAAVLGWMLGSNNGQRVVFTILLLLVAPAYSFNCLGM
GNRDFIEGASGATWVDLVLEGDSCLTIMANDKPTLDVRMINIEASQLAEV
RSYCYHASVTDISTVARCPTTGEAHNEKRADSSYVCKQGFTDRGWGNGCG
LFGKGSIDTCAKFSCTSKAIGRTIQPENIKYEVGIFVHGTTTSENHGNYS
AQVGASQAAKFTVTPNAPSITLKLGDYGEVTLDCEPRSGLNTEAFYVMTV
GSKSFLVHREWFHDLALPWTSPSSTAWRNRELLMEFEEAHATKQSVVALG
SQEGGLHQALAGAIVVEYSSSVKLTSGHLKCRLKMDKLALKGTTYGMCTE
KFSFAKNPADTGHGTVVIELSYSGSDGPCKIPIVSVASLNDMTPVGRLVT
VNPFVATSSANSKVLVEMEPPFGDSYIVVGRGDKQINHHWHKAGSTLGKA
FSTTLKGAQRLAALGDTAWDFGSIGGVFNSIGKAVHQVFGGAFRTLFGGM
SWITQGLMGALLLWMGVNARDRSIALAFLATGGVLVFLATNVHAD
```

Japanese Encephalitis Codon optimized Sequences used in the vaccine, DNA sequence (SEQ ID NO:2)

```
ATGACCAAGAAGCCAGGCGGCCCTGGCAAGAACAGGGCCATCAATATGCT
GAAGAGGGGACTGCCCCGCGTGTTCCCTCTGGTGGGCGTGAAGCGCGTGG
TCATGAGCCTGCTGGACGGCAGAGGCCCCGTGCGGTTTGTGCTGGCCCTG
```

```
ATCACATTCTTTAAGTTCACCGCCCTGGCACCAACAAAGGCCCTGCTGGG

CCGGTGGAAGGCAGTGGAGAAGTCTGTGGCCATGAAGCACCTGACCAGCT

TTAAGAGAGAGCTGGGCACACTGATCGATGCCGTGAACAAGAGGGGCCGC

AAGCAGAACAAGAGGGGCGGCAATGAGGGCTCTATCATGTGGCTGGCCAG

CCTGGCAGTGGTCATCGCATGCGCAGGAGCCATGAAGCTGTCTAACTTCC

AGGGCAAGCTGCTGATGACAATCAACAATACCGACATCGCCGATGTGATC

GTGATCCCCACCTCCAAGGGCGAGAATAGGTGTTGGGTGCGCGCCATCGA

CGTGGGCTACATGTGCGAGGATACAATCACCTATGAGTGTCCCAAGCTGA

CCATGGGCAACGACCCTGAGGACGTGGATTGCTGGTGTGATAATCAGGAG

GTGTACGTGCAGTATGGCCGGTGCACACGGACCAGACACAGCAAGAGATC

CCGGAGATCTGTGAGCGTGCAGACCCACGGAGAGAGCTCCCTGGTGAACA

AGAAGGAGGCCTGGCTGGACAGCACAAAGGCCACCAGGTACCTGATGAAG

ACAGAGAACTGGATCATCCGCAATCCCGGCTATGCCTTTCTGGCCGCCGT

GCTGGGATGGATGCTGGGCTCCAACAATGGCCAGAGGGTGGTGTTCACCA

TCCTGCTGCTGCTGGTGGCCCCTGCCTATTCTTTTAACTGCCTGGGCATG

GGCAATAGGGATTTCATCGAGGGAGCATCCGGAGCAACCTGGGTGGACCT

GGTGCTGGAGGGCGATTCTTGTCTGACCATCATGGCCAACGACAAGCCAA

CACTGGATGTGAGGATGATCAATATCGAGGCATCTCAGCTGGCAGAGGTG

CGCAGCTACTGCTATCACGCCAGCGTGACAGACATCTCCACCGTGGCAAG

GTGTCCAACCACAGGAGAGGCCCACAACGAGAAGAGAGCCGACTCTAGCT

ACGTGTGCAAGCAGGGCTTTACCGATCGGGCTGGGGAAATGGATGTGGA

CTGTTTGGCAAGGGCAGCATCGATACCTGCGCCAAGTTCTCTTGTACAAG

CAAGGCCATCGGCAGAACCATCCAGCCTGAGAACATCAAGTACGAAGTGG

GCATCTTTGTGCACGGCACCACAACCTCCGAGAACCACGGCAATTATTCC

GCCCAAGTGGGAGCATCTCAGGCAGCAAAGTTCACAGTGACCCCTAACGC

CCCATCTATCACCCTGAAGCTGGGCGACTACGGCGAGGTGACACTGGATT

GCGAGCCACGGAGCGGCCTGAATACAGAGGCCTTTTATGTGATGACCGTG

GGCTCCAAGTCTTTTCTGGTGCACAGAGAGTGGTTCCACGACCTGGCCCT

GCCATGGACCAGCCCCTCCTCTACAGCCTGGAGGAATCGCGAGCTGCTGA

TGGAGTTCGAGGAGGCACACGCAACCAAGCAGAGCGTGGTGGCCCTGGGC

TCCCAGGAGGGAGGACTGCACCAGGCCCTGGCAGGAGCCATCGTGGTGGA

GTACAGCTCCTCTGTGAAGCTGACCAGCGGCCACCTGAAGTGCCGGCTGA

AGATGGACAAGCTGGCCCTGAAGGGCACAACCTATGGCATGTGCACAGAG

AAGTTCTCCTTTGCCAAGAACCCTGCCGATACAGGCCACGGCACCGTGGT

CATCGAGCTGAGCTACTCCGGCTCTGACGGCCCTTGTAAGATCCCAATCG

TGTCCGTGGCCTCTCTGAATGATATGACACCAGTGGGCAGACTGGTGACC

GTGAACCCCTTTGTGGCCACAAGCTCCGCCAATAGCAAGGTGCTGGTGGA

GATGGAGCCCCCTTTCGGCGACTCCTACATCGTGGTGGGCAGGGGCGATA

AGCAGATCAACCACCACTGGCACAAGGCAGGCTCCACCCTGGGCAAGGCC

TTCTCTACAACCCTGAAGGGCGCCCAGCGCCTGGCCGCCCTGGGCGACAC
```

```
AGCCTGGGATTTTGGCAGCATCGGCGGCGTGTTCAATTCCATCGGCAAGG

CAGTGCACCAGGTGTTCGGAGGAGCCTTTCGGACCCTGTTCGGAGGCATG

AGCTGGATCACACAGGGACTGATGGGCGCCCTGCTGCTGTGGATGGGCGT

GAACGCCCGGGACAGATCCATCGCCCTGGCCTTTCTGGCAACCGGAGGCG

TGCTGGTGTTCCTGGCCACAAATGTGCACGCCGAT
```

FIGS. 1A to 1C shows as follows. FIG. 1A shows a schematic of a Universal Lentiviral vector for generating cell lines secreting *Flavivirial* VLPs. Restriction sites introduced on either side of structural protein allow easy swapping of the structural proteins of any *Flavivirus* including but not limited to Zika, Yellow Fever Virus, Japanese Encephalitis Virus, Denguel-4 Virus, Tick Borne Encephalitis Virus, West Nile Virus, St Louis Encephalitis Virus, etc. FIG. 1A shows that the lentiviral vector expresses, in this case, JEV CprME along with the Zika protease NS2B-3, which has been codon optimized, for production of capsid containing virus like particles. FIG. 1B shows culture supernatants were harvested from 293T cell line stably expressing the JEV CprME (293T-JEV-Lenti) and analyzed for E protein expression by western blotting using specific antibody. Lanes 1, 2, 3 represent supernatants harvested at different days and C represents Control supernatants from 293T cells. FIG. 1C shows 293T-JEV-Lenti or control 293T cells were stained for E protein expression using the pan *Flaviviral* 4G2 monoclonal antibody followed by fluorescence microscopy.

Zika NS2B3 Protein sequence with Hemagglutinin Tag. (SEQ ID NO:3)

```
MATTMSWPPSEVLTAVGLICALAGGFAKADIEMAGPMAAVGLLIVSYVVS

GKSVDMYIERAGDITWEKDAEVTGNSPRLDVALDESGDFSLVEDDGPPMR

EIILKVVLMTICGMNPIAIPFAAGAWYVYVKTGKRSGALWDVPAPKEVKK

GETTDGVYRVMTRRLLGSTQVGVGVMQEGVFHTMWHVTKGSALRSGEGRL

DPYWGDVKQDLVSYCGPWKLDAAWDGHSEVQLLAVPPGERARNIQTLPGI

FKTKDGDIGAVALDYPAGTSGSPILDKCGRVIGLYGNGVVIKNGSYVSAI

TQGRREEETPVECFEPSMLKKKQLTVLDLHPGAGKTRRVLPEIVREAIKT

RLRTVILAPTRVVAAEMEEALRGLPVRYMTTAVNVTHSGTEIVDLMCHAT

FTSRLLQPIRVPNYNLYIMDEAHF'TDPSSIAARGYISTRVEMGEAAAIF

MTATPPGTRDAFPDSNSPIMDTEVEVPERAWSSGFDWVTDHSGKTVWFVP

SVRNGNEIAACLTKAGKRVIQLSRKTFETEFQKTKHQEWDFVVTTDISEM

GANFKADRVIDSRRCLKPVILDGERVILAGPMPVTHASAAQRRGRIGRNP

NKPGDEYLYGGGCAETDEDHAHWLEARMLLDNIYLQDGLIASLYRPEADK

VAAIEGEFKLRTEQRKTFVELMKRGDLPVWLAYQVASAGITYTDRRWCFD

GTTNNTIMEDSVPAEVWTRHGEKRVLKPRWMDARVCSDHAALKSFKEFAA

GKRYPYDVPDYA
```

DNA sequence comprising IRES sequence followed by codon optimized Zika NS2B3. (SEQ ID NO:4)

```
CTCGAGGCCCCTCTCCCTCCCCCCCCCCTAACGTTACTGGCCGAAGCCGC

TTGGAATAAGGCCGGTGTGCGTTTGTCTATATGTTATTTTCCACCATATT
```

-continued
```
GCCGTCTTTTGGCAATGTGAGGGCCCGGAAACCTGGCCCTGTCTTCTTGA
CGAGCATTCCTAGGGGTCTTTCCCCTCTCGCCAAAGGAATGCAAGGTCTG
TTGAATGTCGTGAAGGAAGCAGTTCCTCTGGAAGCTTCTTGAAGACAAAC
AACGTCTGTAGCGACCCTTTGCAGGCAGCGGAACCCCCCACCTGGCGACA
GGTGCCTCTGCGGCCAAAAGCCACGTGTATAAGATACACCTGCAAAGGCG
GCACAACCCCAGTGCCACGTTGTGAGTTGGATAGTTGTGGAAAGAGTCAA
ATGGCTCTCCTCAAGCGTATTCAACAAGGGGCTGAAGGATGCCCAGAAGG
TACCCCATTGTATGGGATCTGATCTGGGGCCTCGGTACACATGCTTTACA
TGTGTTTAGTCGAGGTTAAAAAAACGTCTAGGCCCCCCGAACCACGGGGA
CGTGGTTTTCCTTTGAAAAACACGATGATAATATGGCCACAACCATGAGC
TGGCCACCTTCTGAGGTGCTGACAGCAGTGGGCCTGATCTGTGCACTGGC
AGGAGGATTCGCAAAGGCAGACATCGAGATGGCAGGACCAATGGCAGCAG
TGGGCCTGCTGATCGTGAGCTACGTGGTGTCTGGCAAGAGCGTGGACATG
TATATCGAGAGGGCCGGCGACATCACCTGGGAGAAGGACGCCGAGGTGAC
AGGAAACTCCCCTCGCCTGGACGTGGCCCTGGATGAGAGCGGCGACTTCT
CCCTGGTGGAGGACGATGGCCCACCCATGCGCGAGATCATCCTGAAGGTG
GTGCTGATGACCATCTGCGGCATGAATCCAATCGCAATCCCCTTTGCCGC
AGGAGCATGGTACGTGTATGTGAAGACAGGCAAGCGGTCTGGCGCCCTGT
GGGATGTGCCAGCACCAAAGGAGGTGAAGAAGGGCGAGACAACAGACGGC
GTGTACAGAGTGATGACCCGGAGACTGCTGGGCAGCACACAAGTGGGAGT
GGGCGTGATGCAGGAGGGCGTGTTTCACACCATGTGGCACGTGACAAAGG
GCTCTGCCCTGAGGAGCGGAGAGGGCCGCCTGGACCCATACTGGGCGAT
GTGAAGCAGGACCTGGTGTCCTATTGTGGACCATGGAAGCTGGATGCAGC
ATGGGACGGACACTCTGAGGTGCAGCTGCTGGCAGTGCCTCCAGGAGAGA
GGGCCAGAAACATCCAGACCCTGCCCGGCATCTTCAAGACAAAGGACGGC
GACATCGGAGCAGTGGCCCTGGATTACCCTGCAGGCACCTCTGGCAGCCC
AATCCTGGACAAGTGCGGCAGAGTGATCGGCCTGTACGGCAACGGCGTGG
TCATCAAGAATGGCTCCTACGTGAGCGCCATCACCCAGGGCAGGCGCGAG
GAGGAGACACCTGTGGAGTGTTTTGAGCCCTCCATGCTGAAGAAGAAGCA
GCTGACCGTGCTGGATCTGCACCCAGGAGCAGGCAAGACAAGGAGAGTGC
TGCCTGAGATCGTGAGGGAGGCCATCAAGACCAGGCTGAGGACAGTGATC
CTGGCACCAACCAGGGTGGTGGCAGCAGAGATGGAGGAGGCCCTGCGGGG
CCTGCCTGTGAGATACATGACCACAGCCGTGAACGTGACCCACAGCGGCA
CAGAGATCGTGGACCTGATGTGCCACGCCACCTTCACATCCAGGCTGCTG
CAGCCTATCCGCGTGCCAAACTACAATCTGTATATCATGGATGAGGCCCA
CTTTACCGACCCAAGCTCCATCGCAGCAAGGGGATATATCTCCACAAGAG
TGGAGATGGGCGAGGCTGCCGCCATCTTCATGACCGCAACACCACCTGGA
ACCAGGGATGCCTTTCCCGACTCCAATTCTCCTATCATGGACACAGAGGT
GGAGGTGCCAGAGAGGGCATGGTCTAGCGGCTTCGATTGGGTGACCGACC
ACTCCGGCAAGACAGTGTGGTTTGTGCCCTCTGTGAGAAACGGCAATGAG
ATCGCCGCCTGTCTGACCAAGGCCGGCAAGAGAGTGATCCAGCTGAGCCG
CAAGACCTTCGAGACAGAGTTTCAGAAGACAAAGCACCAGGAGTGGGATT
TCGTGGTGACCACAGACATCAGCGAGATGGGCGCCAACTTTAAGGCCGAT
AGAGTGATCGACTCCAGGCGCTGCCTGAAGCCTGTGATCCTGGATGGCGA
GAGAGTGATCCTGGCAGGACCTATGCCAGTGACCCACGCATCCGCCGCAC
AGAGGAGAGGCCGGATCGGCAGAAACCCCAATAAGCCTGGCGACGAGTAC
CTGTATGGCGGCGGCTGTGCCGAGACAGACGAGGATCACGCACACTGGCT
GGAGGCAAGGATGCTGCTGGATAATATCTACCTGCAGGACGGCCTGATCG
CCAGCCTGTATAGACCTGAGGCCGATAAGGTGGCCGCCATCGAGGGCGAG
TTCAAGCTGCGGACCGAGCAGAGAAAGACATTTGTGGAGCTGATGAAGAG
GGGCGACCTGCCAGTGTGGCTGGCATACCAGGTGGCATCTGCCGGCATCA
CCTATACAGATAGGCGCTGGTGCTTCGACGGCACCACAAACAATACCATC
ATGGAGGACAGCGTGCCTGCCGAAGTGTGGACAAGGCACGGCGAGAAGCG
CGTGCTGAAGCCACGGTGGATGGATGCACGGGTGTGCTCTGACCACGCCG
CCCTGAAGAGCTTCAAGGAGTTTGCCGCCGGCAAGAGATATCCCTACGAT
GTCCCTGATTACGCATAACCGCGGGTTTAAAC
```

Example II. Stable Cell Lines Secreting Capsid Coating Yellow Fever Virus Like Particles For Vaccine Use Yellow fever is an acute viral hemorrhagic disease that causes fever and Jaundice. Forty countries in Africa and Americas are endemic for this disease. The estimated burden of yellow fever during 2013 was 84,000-170,000 severe cases and 29,000-60,000 deaths. Although a vaccine for YFV is currently available, this vaccine is a Live Attenuated Virus (LAV) vaccine which has its disadvantages due to its replication competent nature. There have been rare reports of serious side-effects from the yellow fever vaccine. This is described by severe 'adverse events following immunization' (AEFI), when the vaccine provokes an attack on the liver, kidneys or the nervous system. The risk of AEFI is higher for people over 60 years of age and in immunocompromised individuals like: (1) Infants aged less than 9 months; (2) Pregnant women; (3) People with severe allergies to egg protein; and/or (4) People with severe immunodeficiency due to symptomatic HIV/AIDS or other causes, or who have a thymus disorder.

Moreover, the cost of production and safety of live attenuated virus vaccines is also limited. Virus like particles (VLP) on the other hand provide a cheaper, safer and more effective vaccine platform for many viral diseases. The success of the VLP vaccine against Papilloma virus (HPV) exemplifies the success of this platform. Currently there are no VLP vaccines against YFV approved for human use.

The present inventors developed a VLP platform for YFV related Zika virus and shown that this platform can provide an economical, safe and highly effective vaccine for use in humans. Our technology is built on 4 main innovations.

A vector system was developed in which the structural proteins of YFV (CprME) are co-expressed with a Zika NS2B3 protein via a single vector by utilizing IRES sequence upstream for the NS2B3 coding region. (Vector design to be patented).

The inventors generated a consensus sequence of the published YFV sequences and used the consensus sequence translation to codon optimize the sequence for high expression of the proteins. (Sequence to be patented).

The inventors used a lentiviral system to generate stable cell lines that constitutively express and secrete YFV CprME VLPs into the culture supernatant. (Method and stable cell lines to be patented).

The production and purification of the VLPs from these stable cell lines was further optimized.

Yellow Fever Virus consensus Amino acid sequence (SEQ ID NO:5)

MSGRKAQGRTLGVNMVRRGVRSLSNKIKQKTKQIGNRPGPSRGVQGFIF
FFLFNILTGKKLTAHLKKLWRMLDPRQGLAVLRKVKRVVASLMRGLASR
KRRSNEMAMVPLLLLGLLALSGGVTLVRKNRWLLLNVTAEDLGKTFSVG
TGNCTTNILEAKYWCPDSMEYNCPNLSPREEPDDIDCWCYGVENVRVAY
GRCDAVGRSKRSRRAIDLPTHENHGLKTRQEKWMTGRMGERQLQKIERW
LVRNPFFAVTALAIAYLVGNNTTQRVVIALLVLAVGPAYSAHCIGITDR
DFIEGVHGGTWVSATLEQDKCVTVMAPDKPSLDISLQTVAIDGPAEARK
VCYSAVLTHVKINDKCPSTGEAHLAEENDGDNACKRTYSDRGWGNGCGL
FGKGSIVACAKFTCAKSMSLFEVDQTKIQYVIRAQLHVGAKQENWNTDI
KTLKFDALSGSQEAEFTGYGKATLECQVQTAVDFGNSYIAEMEKDSWIV
DRQWAQDLTLPWQSGSGGIWREMHHLVEFEPPHAATIRVLALGNQEGSL
KTALTGAMRVTKDENDNNLYKLHGGHVSCRVKLSALTLKGTSYKMCTDK
MSFVKNPTDTGHGTVVMQVKVPKGAPCKIPVIVADDLTAAVNKGILVTV
NPIASTNDDEVLIEVNPPFGDSYIIVGTGDSRLTYQWHKEGSSIGKLFT
QTMKGAERLAVMGDAAWDFSSAGGFFTSVGKGIHTVFGSAFQGLFGGLS
WITKVIMGAVLIWVGINTRNMTMSMSMILVGVIMMFLSLGVGAD

Yellow Fever Virus consensus and codon optimized DNA sequence (SEQ ID NO:6)

ATGTCCGGAAGGAAGGCACAGGGAAGAACCCTGGGCGTGAACATGGTGC
GGAGAGGCGTGCGGTCCCTGTCTAATAAGATCAAGCAGAAGACAAAGCA
GATCGGAAACAGGCCTGGACCATCTCGCGGCGTGCAGGGCTTCATCTTC
TTTTTCCTGTTTAATATCCTGACCGGCAAGAAGCTGACAGCCCACCTGA
AGAAGCTGTGGAGGATGCTGGACCCCAGACAGGGACTGGCCGTGCTGAG
GAAGGTGAAGAGGGTGGTGGCAAGCCTGATGAGGGGACTGGCAAGCAGG
AAGAGGCGCTCCAACGAGATGGCCATGGTGCCTCTGCTGCTGCTGGGAC
TGCTGGCCCTGTCTGGAGGAGTGACCCTGGTGAGGAAGAACCGCTGGCT
GCTGCTGAATGTGACAGCCGAGGATCTGGGCAAGACCTTCAGCGTGGGC
ACAGGCAACTGCACCACAAATATCCTGGAGGCCAAGTACTGGTGCCCTG
ACTCCATGGAGTATAACTGTCCAAATCTGTCTCCCAGAGAGGAGCCTGA
CGATATCGATTGCTGGTGTTACGGCGTGGAGAATGTGCGGGTGGCCTAT
GGCAGATGTGACGCCGTGGGCCGGTCTAAGAGAAGCCGGAGAGCCATCG
ATCTGCCAACCCACGAGAACCACGGCCTGAAGACCAGACAGGAGAAGTG

GATGACAGGCCGGATGGGCGAGAGACAGCTGCAGAAGATCGAGAGGTGG
CTGGTGCGCAACCCCTTCTTCGCAGTGACCGCCCTGGCAATCGCATACC
TGGTGGGCAACAATACCACACAGAGGGTGGTCATCGCCCTGCTGGTGCT
GGCAGTGGGACCAGCATATAGCGCCCACTGCATCGGCATCACCGACAGA
GATTTCATCGAGGGAGTGCACGGAGGAACCTGGGTGTCCGCCACACTGG
AGCAGGACAAGTGCGTGACCGTGATGGCCCCCGACAAGCCTTCCCTGGA
TATCTCTCTGCAGACAGTGGCAATCGACGGACCAGCCGAGGCCAGAAAG
GTGTGCTACTCTGCCGTGCTGACCCACGTGAAGATCAATGATAAGTGTC
CAAGCACAGGAGAGGCACACCTGGCAGAGGAGAACGACGGCGATAATGC
CTGCAAGAGGACCTATTCCGACCGGGGCTGGGGAAACGGATGTGGACTG
TTTGGCAAGGGCTCTATCGTGGCCTGCGCCAAGTTCACCTGTGCCAAGA
GCATGTCCCTGTTTGAGGTGGATCAGACAAAGATCCAGTACGTGATCAG
GGCACAGCTGCACGTGGGAGCAAAGCAGGAGAACTGGAATACCGACATC
AAGACACTGAAGTTCGATGCCCTGTCTGGCAGCCAGGAGGCCGAGTTTA
CCGGCTACGGCAAGGCCACACTGGAGTGCCAGGTGCAGACCGCCGTGGA
CTTCGGCAATAGCTATATCGCCGAGATGGAGAAGGACTCCTGGATCGTG
GATCGCCAGTGGGCTCAGGATCTGACACTGCCATGGCAGTCCGGATCTG
GAGGAATCTGGAGGGAGATGCACCACCTGGTGGAGTTTGAGCCCCCTCA
CGCAGCAACCATCAGAGTGCTGGCCCTGGGCAATCAGGAGGGAAGCCTG
AAGACCGCCCTGACAGGAGCCATGAGGGTGACAAAGGACGAGAACGATA
ACAATCTGTACAAGCTGCACGGAGGACACGTGTCTTGCAGGGTGAAGCT
GAGCGCCCTGACCCTGAAGGGCACATCTTACAAAATGTGCACCGACAAG
ATGAGCTTCGTGAAGAACCCAACCGATACAGGCCACGGCACAGTGGTCA
TGCAGGTGAAGGTGCCAAAGGGCGCCCCCTGTAAGATCCCTGTGATCGT
GGCCGACGATCTGACCGCCGCCGTGAATAAGGGCATCCTGGTGACCGTG
AACCCCATCGCCTCCACAAATGACGATGAGGTGCTGATCGAGGTGAACC
CACCCTTTGGCGACTCCTACATCATCGTGGGCACCGGCGATTCTAGGCT
GACATATCAGTGGCACAAGGAGGGCAGCTCCATCGGCAAGCTGTTCACC
CAGACAATGAAGGGAGCAGAGCGCCTGGCCGTGATGGGCGACGCCGCCT
GGGATTTTTCTAGCGCCGGCGGCTTTTTCACCAGCGTGGGCAAGGGCAT
CCACACAGTGTTTGGAAGCGCCTTCCAGGGACTGTTTGGAGGACTGTCC
TGGATCACCAAAGTGATCATGGGCGCCGTGCTGATCTGGGTGGGCATCA
ACACCCGGAATATGACAATGAGCATGTCCATGATCCTGGTGGGCGTGAT
CATGATGTTCCTGTCCCTGGGCGTGGGCGCCGAC

Figures 2A, 2B, 3A, 3B:
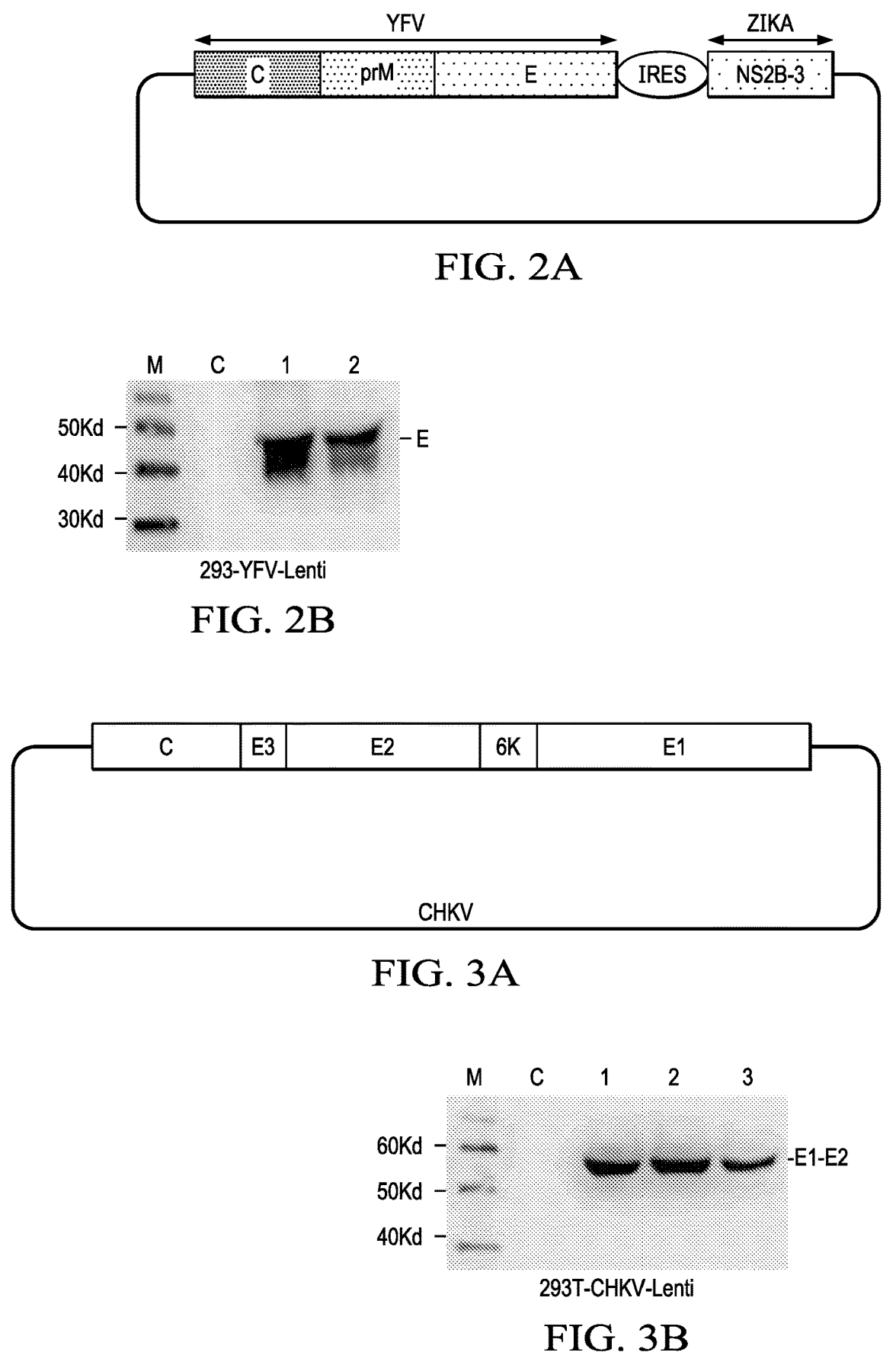

FIGS. 2A and 2B show as follows. FIG. 2A shows a schematic of a lentiviral vector expressing Yellow Fever Virus (YFV) CprME along with the protease NS2B-3 for production of capsid containing virus like particles. FIG. 2B shows supernatants harvested from a 293T cell line stably expressing the YFV CprME proteins in the presence of the NSB2-3 protease that is required for release of VLPs from cells. Expression of E protein was analyzed by western blotting using specific antibodies. Lanes 1 and 2 represent supernatants harvested at different days of culture and C represents Control supernatants from 293Y cells. M-molecular weight.

Example III. Chikungunya Virus (CHIKV) Virus Like Particles For Vaccines

The present inventors have developed a VLP platform for the related arbovirus, Zika virus, using stable cell lines that constitutively secrete VLPs and demonstrated that this platform can provide an economical, safe and highly effective vaccine especially for use in humans. A similar stable cell line method was used to generate CHIKV VLP secreting cell line. The present invention provides three substantial improvements and advantages over the prior art. The development of the CHIKV VLP is the subject of a co-pending patent application by the present inventors and is incorporated herein in its entirety.

The inventors generated a consensus sequence of 478 CHIKV sequences from year 2006 onwards to represent the most current CHIKV isolates. The artificial consensus sequence and translation was codon optimized to drive high expression of the proteins. The use of the consensus sequence provides a vaccine that is most relevant to current outbreaks.

The inventors used a lentiviral system to generate stable cell lines that constitutively express CHIKV structural proteins and secrete the VLPs in the supernatant.

Finally, the inventors optimized production and purification of the VLPs from these stable cell lines.

Chikungunya Virus Consensus Sequences used in the vaccine, Amino acid sequence: (SEQ ID NO:7).

MEFIPTQTFYNRRYQPRPWTPRPTIQVIRPRPRPQRKAGQLAQLISAVN

KLTMRVVPQQKPRKNRKNKKQKQKQQAPRNNTNQKKQPPKKKPVQKKKK

PGRRERMCMKIENDCIFEVKHEGKVTGYACLVGDKVMKPAHVKGTIDNA

DLAKLAFKRSSKYDLECAQIPVHMKSDASKFTHEKPEGYYNWHHGAVQY

SGGRFTIPTGAGKPGDSGRPIFDNKGRVVAIVLGGANEGARTALSVVTW

NKDIVTKITPEGAEEWSLAIPVMCLLANTTFPCSRPPCTPCCYEKEPEK

TLRMLEDNVMSPGYYQLLQASLTCSPRRQRRSIKDHFNVYKATRPYLAH

CPDCGEGHSCHSPVALERIRNEATDGTLKIQVSLQIGIKTDDSHDWTKL

RYMDNHMPADAERAGLFVRTSAPCTITGTMGHFILARCPKGETLTVGFT

DGRKISHSCTHPFHHDPPVIGREKFHSRPQHGRELPCSTYAQSTAATAE

EIEVHMPPDTPDRTLMSQQSGNVKITVNSQTVRYKCNCGDSSEGLTTTD

KVINNCKVDQCHAAVTNHKKWQYNSPLVPRNAEFGDRKGKVHIPFPLAN

VTCRVPKARNPTVTYGKNQVIMLLYPDHPTLLSYRNMGEEPNYQEEWVT

HKKEIRLTVPTEGLEVTWGNNEPYKYWPQLSTNGTAHGHPHEIILYYYE

LYPTMTAVVLSVASFILLSMVGVAVGMCMCARRRCITPYELTPGATVPF

LLSLICCIRTAKAATYQEAAVYLWNEQQPLFWMQALIPLAALIVLCNCL

RLLPCCCKMLTFLAVLSVGAHTVSAYEHVTVIPNTVGVPYKTLVNRPGY

SPMVLEMELLSVTLEPTLSLDYITCEYKTVIPSPYVKCCGTAECKDKSL

PDYSCKVFTGVYPFMWGGAYCFCDTENTQLSEAHVEKSESCKTEFASAY

RAHTASASAKLRVLYQGNNITVAAYANGDHAVTVKDAKFIVGPMSSAWT

PFDNKIVVYKGDVYNMDYPPFGAGRPGQFGDIQSRTPESEDVYANTQLV

LQRPSAGTVHVPYSQAPSGFKYWLKERGASLQHTAPFGCQIATNPVRAM

NCAVGNMPISIDIPDAAFTRVVDAPSLTDMSCEVSACTHSSDFGGVAII

KYAASKKGKCAVHSMTNAVTIREAEIEVEGNSQLQISFSTALASAEFRV

QVCSTQVHCAAECHPPKDHIVNYPASHTTLGVQDISATAMSWVQKITGG

VGLVVAVAALILIVVLCVSFSRH

Codon Optimized Chikungunya Virus Consensus Sequences used in the vaccine, DNA sequence (SEQ ID NO:8).

ATGGAGTTCATCCCCACACAGACCTTTTATAACCGGAGATACCAGCCCA

GGCCTTGGACCCCACGCCCAACAATCCAGGTCATCAGGCCTCGGCCAAG

ACCACAGAGGAAGGCAGGACAGCTGGCACAGCTGATCAGCGCCGTGAAT

AAGCTGACCATGCGCGTGGTGCCCCAGCAGAAGCCTCGGAAGAACAGAA

AGAATAAGAAGCAGAAGCAGAAGCAGCAGGCCCCAAGGAACAATACCAA

CCAGAAGAAGCAGCCCCCCAAGAAGAAGCCTGTGCAGAAGAAGAAGAAG

CCAGGCAGGCGCGAGCGCATGTGCATGAAGATCGAGAATGATTGCATCT

TCGAGGTGAAGCACGAGGGCAAGGTGACCGGCTACGCCTGTCTGGTGGG

CGACAAAGTGATGAAGCCCGCCCACGTGAAGGGCACAATCGACAACGCC

GATCTGGCCAAGCTGGCCTTCAAGAGGAGCTCCAAGTATGATCTGGAGT

GCGCCCAGATCCCCGTGCACATGAAGAGCGACGCCTCCAAGTTTACCCA

CGAGAAGCCTGAGGGCTACTATAATTGGCACCACGGAGCAGTGCAGTAC

TCTGGAGGCAGGTTCACCATCCCTACAGGAGCAGGCAAGCCAGGCGACA

GCGGCAGACCCATCTTTGATAATAAGGGAAGAGTGGTGGCAATCGTGCT

GGGAGGAGCAAACGAGGGCGCCAGAACCGCCCTGAGCGTGGTGACATGG

AATAAGGATATCGTGACCAAGATCACACCTGAGGGAGCAGAGGAGTGGT

CTCTGGCAATCCCAGTGATGTGCCTGCTGGCCAACACCACATTCCCATG

TAGCCGGCCACCATGCACCCCATGCTGTTACGAGAAAGAGCCTGAGAAG

ACACTGAGAATGCTGGAGGACAATGTGATGTCCCCTGGCTACTATCAGC

TGCTGCAGGCCTCTCTGACCTGTAGCCCACGGAGACAGAGGCGCTCTAT

CAAGGATCACTTTAACGTGTATAAGGCCACAAGGCCTTACCTGGCACAC

TGTCCAGACTGCGGAGAGGGACACTCTTGCCACAGCCCAGTGGCCCTGG

AGCGGATCAGAAATGAGGCCACCGATGGCACACTGAAGATCCAGGTGAG

CCTGCAGATCGGCATCAAGACCGACGATTCCCACGACTGGACAAAGCTG

CGCTACATGGACAACCACATGCCAGCCGATGCAGAGAGGGCAGGACTGT

TCGTGAGAACCAGCGCCCCCTGTACAATCACCGGCACAATGGGCCACTT

CATCCTGGCAAGGTGCCCAAAGGGAGAGACCCTGACAGTGGGCTTTACC

GATGGCCGCAAGATCTCTCACAGCTGTACACACCCTTTCCACCACGACC

CTCCAGTGATCGGCCGCGAGAAGTTTCACTCCCGGCCACAGCACGGAAG

AGAGCTGCCCTGCTCTACCTATGCACAGAGCACCGCCGCCACAGCCGAG

GAGATCGAGGTGCACATGCCCCCTGACACCCCCGATCGGACACTGATGT

CCCAGCAGTCTGGCAACGTGAAGATCACCGTGAATAGCCAGACAGTGAG

-continued
```
ATACAAGTGTAACTGCGGCGACTCTAGCGAGGGCCTGACCACAACCGAT

AAAGTGATCAACAATTGTAAGGTGGACCAGTGCCACGCCGCCGTGACCA

ACCACAAGAAGTGGCAGTATAATTCCCCACTGGTGCCCAGGAACGCCGA

GTTCGGCGATCGCAAGGGCAAGGTGCACATCCCTTTTCCACTGGCCAAT

GTGACCTGCAGGGTGCCTAAGGCCCGCAATCCAACCGTGACATACGGCA

AGAACCAGGTCATCATGCTGCTGTATCCTGACCACCCAACACTGCTGAG

CTACAGGAACATGGGCGAGGAGCCTAATTATCAGGAGGAGTGGGTGACC

CACAAGAAGGAGATCCGCCTGACCGTGCCAACAGAGGGCCTGGAGGTGA

CATGGGCAACAATGAGCCCTATAAGTACTGGCCTCAGCTGTCCACCAA

CGGAACAGCACACGGACACCCACACGAGATCATCCTGTACTATTACGAG

CTGTACCCTACCATGACAGCCGTGGTGCTGAGCGTGGCCTCCTTCATCC

TGCTGTCCATGGTGGGAGTGGCAGTGGGAATGTGCATGTGCGCACGGAG

AAGGTGCATCACCCCATATGAGCTGACCCCCGGCGCCACAGTGCCTTTT

CTGCTGTCTCTGATCTGCTGTATCCGGACCGCCAAGGCCGCCACATATC

AGGAGGCCGCCGTGTACCTGTGGAACGAGCAGCAGCCCCTGTTCTGGAT

GCAGGCCCTGATCCCTCTGGCCGCCCTGATCGTGCTGTGCAATTGCCTG

AGACTGCTGCCTTGCTGTTGCAAGATGCTGACCTTTCTGGCCGTGCTGT

CCGTGGGCGCCCACACAGTGTCTGCCTACGAGCACGTGACCGTGATCCC

CAATACAGTGGGCGTGCCTTACAAGACCCTGGTGAACCGGCCAGGCTAT

TCTCCCATGGTGCTGGAGATGGAGCTGCTGAGCGTGACCCTGGAGCCAA

CACTGTCCCTGGATTATATCACCTGTGAGTACAAGACAGTGATCCCCAG

CCCTTACGTGAAGTGTTGCGGCACCGCCGAGTGTAAGGACAAGTCCCTG

CCAGATTATTCTTGCAAGGTGTTCACAGGCGTGTATCCCTTTATGTGGG

GCGGCGCCTACTGTTTCTGCGACACCGAGAACACACAGCTGTCCGAGGC

CCACGTGGAGAAGTCCGAGTCTTGCAAGACCGAGTTTGCCTCTGCCTAC

AGAGCCCACACAGCAAGCGCCTCCGCCAAGCTGAGAGTGCTGTACCAGG

GCAACAATATCACCGTGGCCGCCTATGCCAATGGCGACCACGCCGTGAC

AGTGAAGGATGCCAAGTTCATCGTGGGACCCATGTCCTCTGCCTGGACC

CCATTTGACAATAAGATCGTGGTGTACAAGGGCGACGTGTATAACATGG

ATTACCCACCCTTCGGCGCAGGCAGGCCTGGACAGTTTGGCGATATCCA

GAGCCGCACCCAGAGTCCGAGGACGTGTATGCCAACACACAGCTGGTG

CTGCAGAGGCCAAGCGCCGGCACCGTGCACGTGCCATACTCCCAGGCCC

CCTCTGGCTTCAAGTATTGGCTGAAGGAGAGGGGAGCATCCCTGCAGCA

CACCGCACCATTTGGCTGTCAGATCGCCACAAATCCCGTGAGAGCCATG

AACTGCGCCGTGGGCAATATGCCAATCAGCATCGACATCCCCGATGCCG

CCTTCACCAGAGTGGTGGACGCCCCTTCCCTGACAGATATGAGCTGTGA

GGTGTCCGCCTGCACCCACAGCTCCGACTTTGGCGGCGTGGCCATCATC

AAGTACGCCGCCTCTAAGAAGGGCAAGTGTGCCGTGCACAGCATGACCA

ACGCCGTGACAATCCGGGAGGCCGAGATCGAGGTGGAGGGCAATAGCCA

GCTGCAGATCTCTTTCAGCACCGCCCTGGCCTCCGCCGAGTTTAGAGTG

CAGGTGTGCTCTACACAGGTGCACTGTGCCGCCGAGTGCCACCCTCCAA

AGGATCACATCGTGAACTATCCAGCATCCCACACAACCCTGGGAGTGCA

GGACATCTCTGCCACCGCCATGAGCTGGGTGCAGAAGATCACAGGAGGA

GTGGGACTGGTGGTGGCAGTGGCCGCCCTGATCCTGATCGTGGTGCTGT

GCGTGTCCTTCTCTAGACAC
```

FIG. 3A is a schematic of a lentiviral vector expression that includes CHKV structural proteins for production of capsid containing virus like particles. FIG. 3B is a Western Blot showing the culture supernatants harvested from 293T cells stably transfected and expressing the CHKV structural proteins (293T-CHKV-Lenti) and analyzed for CHKV E1-E2 protein expression. Lanes 1, 2 and 3 represent supernatants harvested from different days and C represents control supernatants from 293T cells. M-molecular weight markers.

Figure 4B:
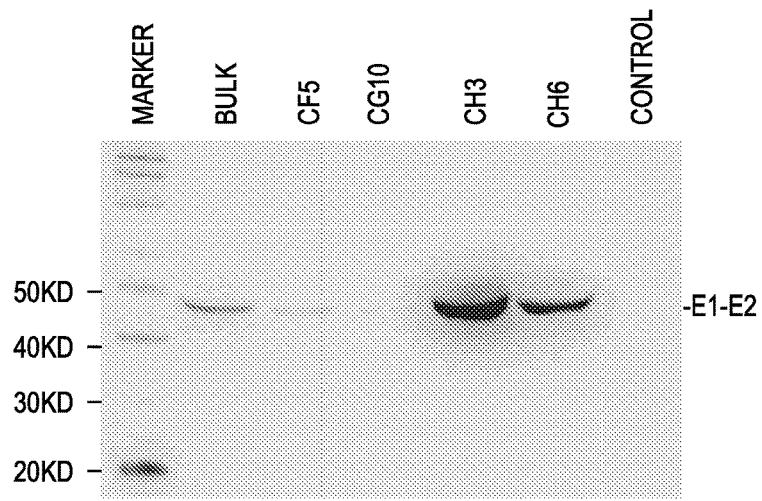

FIGS. 4A and 4B show the establishment of a single cell clones expressing CHKV Structural proteins. In FIG. 4A, the CHKV structural proteins were cloned into the lentiviral vector pLenti6/5-D-Topo and used to produce lentiviral particles containing the CHKV-E1/E2. 293T cells were then transduced with the above lentiviral particles and cells selected by culturing in the presence of blasticidin. Bulk selected cells were confirmed for E1/E2 protein expression via western blotting. Subsequently, cells were plated in 96 well plates using limiting dilution and clones arising from single viable cells selected. In FIG. 4B, the culture supernatants were harvested from 293T single cell clones and concentrated by ultracentrifugation. Expression of the E1/E2 proteins in the supernatants was determined by western blotting.

Figure 5:
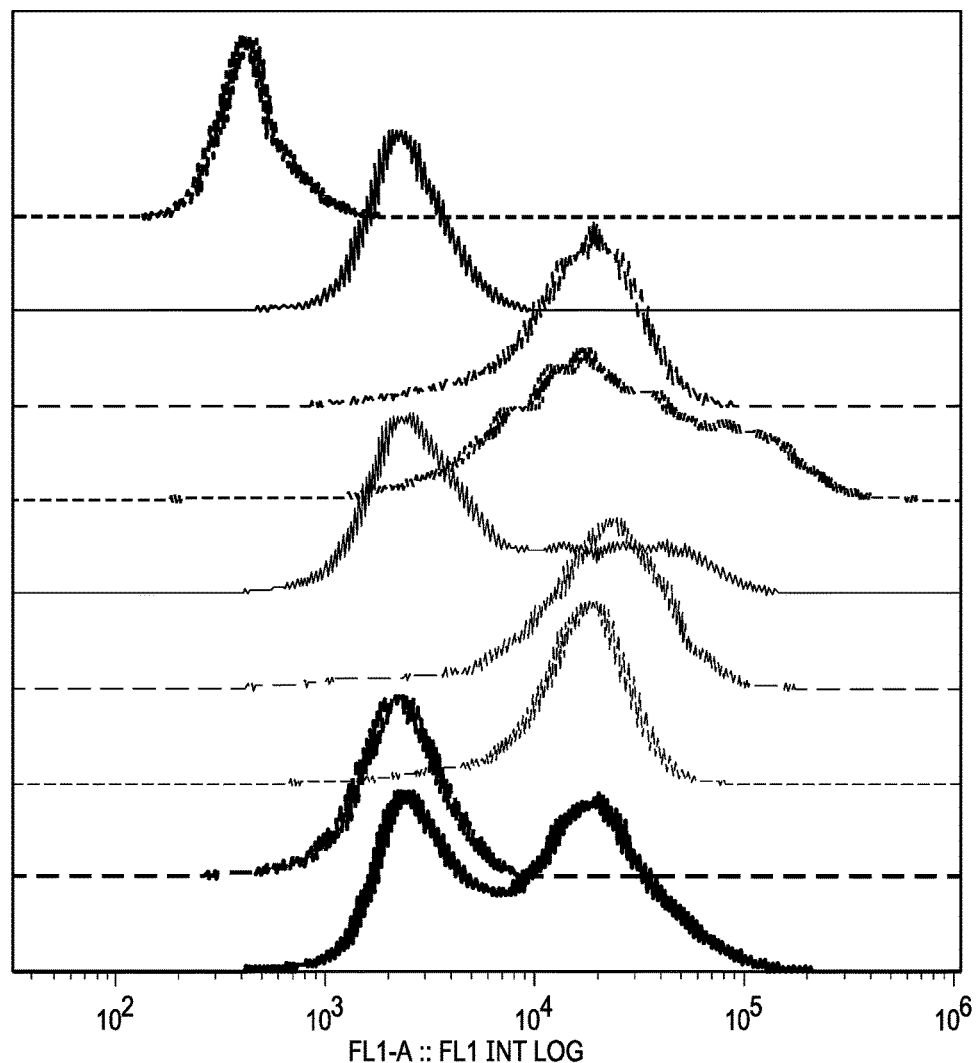
FIG. 5 is a flow cytometry analysis of single cell clones expressing the CHKV-E1/E2.

FIG. 5 is a flow cytometry analysis of single cell clones expressing the CHKV-E1/E2. Six different single cell clones of 293T cells expressing the CHKV-E1/E2 proteins were stained using the CHKV E protein antibody followed by flow cytometry analysis. The bulk selected cell line was used as control. The CH-6, CH-3 and CF-5 cell lines show good CHKV E protein expression. The flow cytometry is in the same order as the table below the graph.

In certain embodiments, the present invention includes the combination of separately manufactured arbovirus VLPs that are combined following Table 1, to combine into a vaccine that includes multiple different arboviruses. These VLPs can be co-packaged into individual or separate containers that are used to immunize individuals that live, or are going to travel to, geographic areas with the prevalence of certain arboviruses. In other embodiments, the various vectors taught herein can be co-expressed in the same cells, again following the teachings of Tables 1 and 2, to generate multivalent arbovirus VLPs in a single cell. By stably transfecting cells with one or more vectors that express multiple arbovirus proteins that are replication deficient but that form multivalent arbovirus VLPs, which may be made in the cells and released mechanically, chemically and/or electrically, or that are preferable secreted by the stably transfected cells.

Figure 6A:
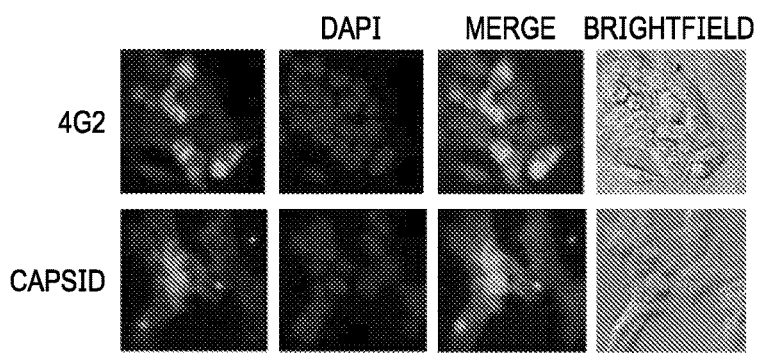
FIGS. 6A to 6F show the characterization of JEV and CHKV protein expression and VLP release.
Figure 6B:
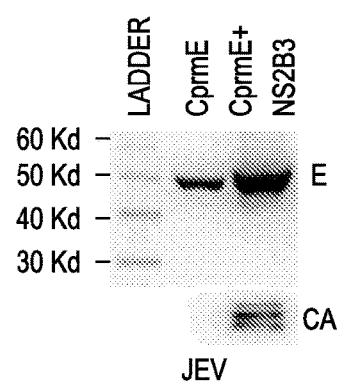
Figure 6C:
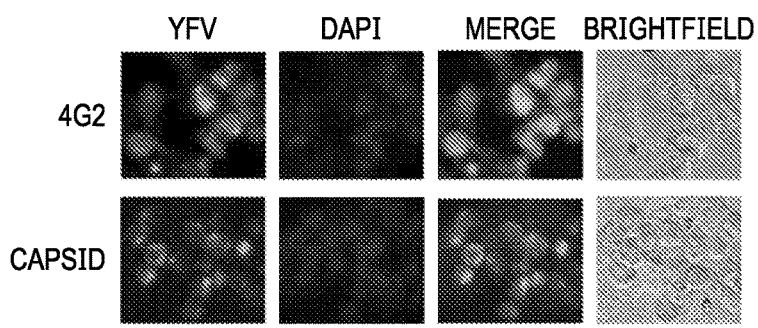
Figure 6D:
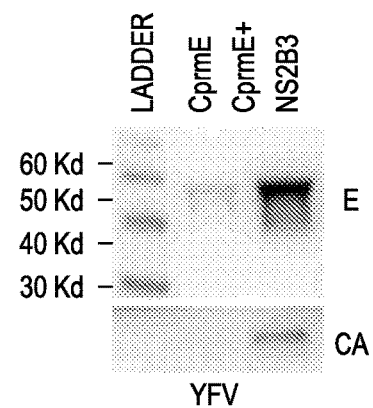
Figure 6E:
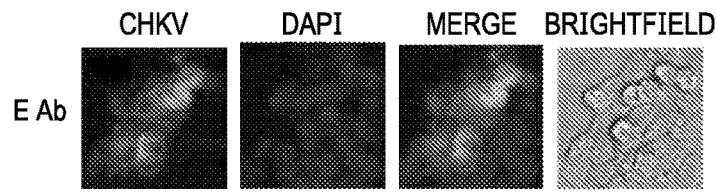
Figure 6F:
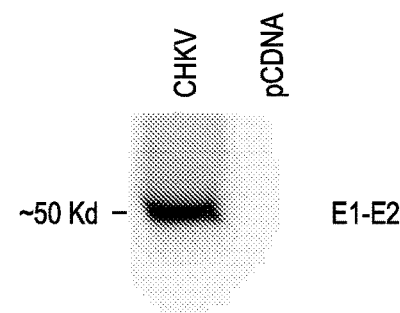

FIGS. 6A to 6F show the characterization of JEV, YFV and CHKV protein expression and VLP release. FIG. 6A: 293T cells were transfected with JEV CprME expression vector. Cells were analyzed for E protein and Capsid protein expression by immunofluorescence microscopy. FIG. 6B: 293T cells were transfected with JEV CprME expression vector alone or the JEV CprME vector along with Zika NS2B-3 expression plasmid. Culture supernatants were analyzed for E protein and Capsid protein expression by western blotting. FIG. 6C: 293T cells were transfected with YFV CprME expression vector and analyzed for E protein and Capsid protein expression by microscopy. FIG. 6D: 293T cells were transfected with YFV CprME expression vector alone or the YFV CprME vector along with Zika NS2B-3 expression plasmid. Culture supernatants were analyzed for E protein and Capsid protein expression by western blotting. FIG. 6E: 293T cells were transfected with CHKV expression vector and analyzed for E protein expression by microscopy. FIG. 6F: 293T cells were transfected with CHKV expression vector. Culture supernatants were analyzed for E1-E2 protein expression by western blotting.

Figures 7A, 7B:
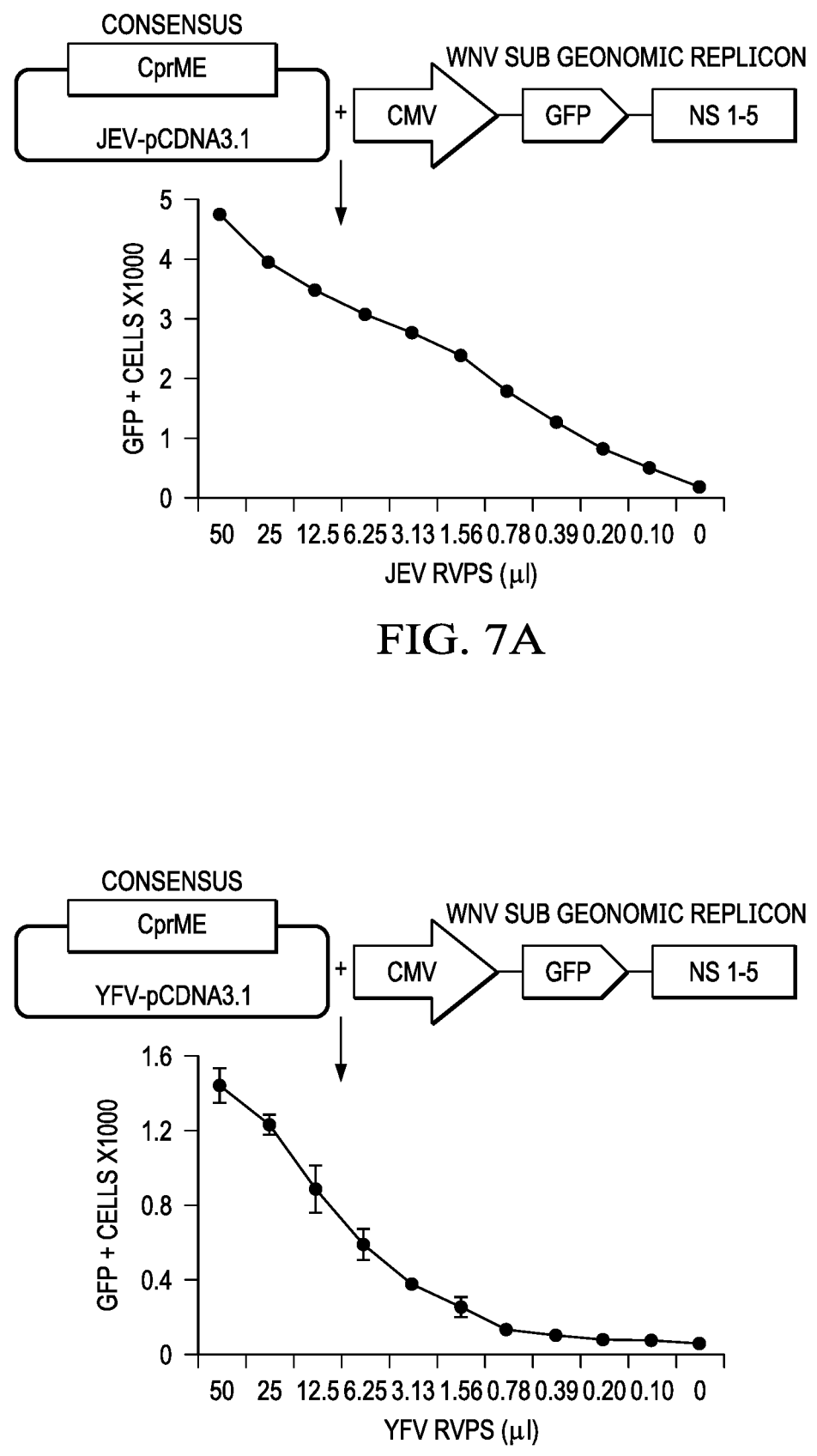
Figure 7C:
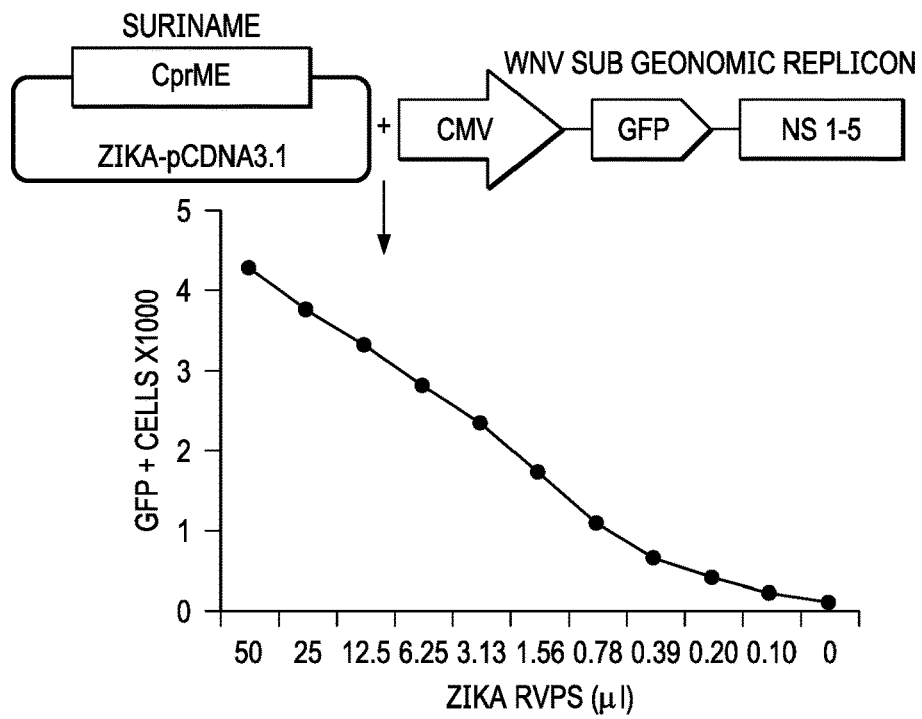
Figure 7D:
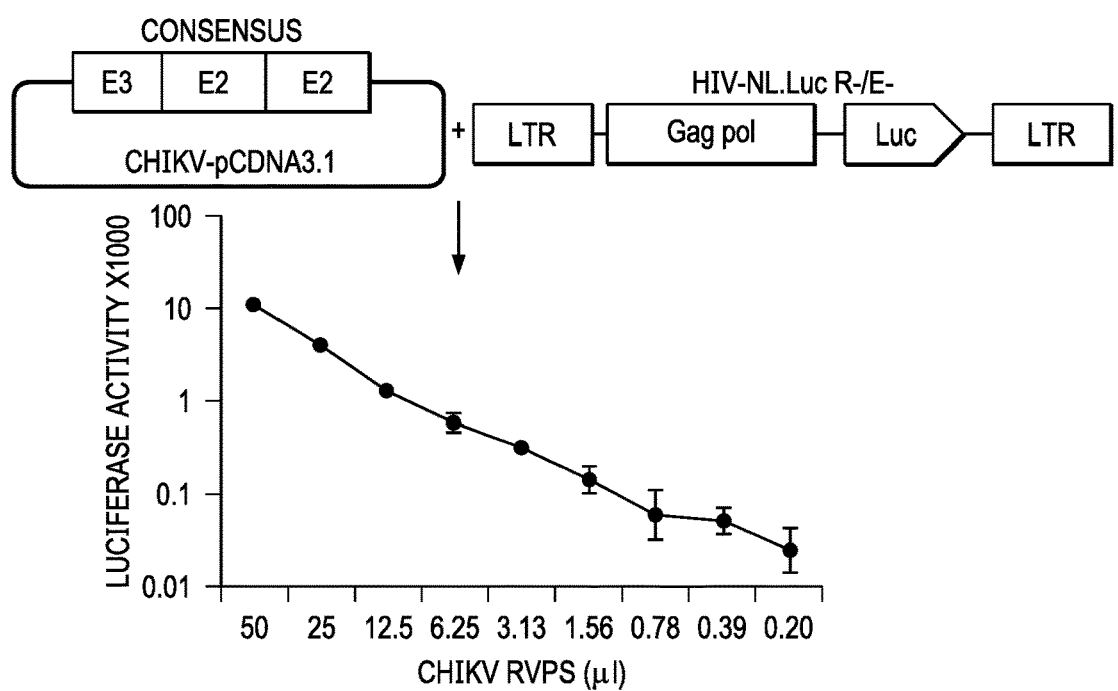
Figure 8A:
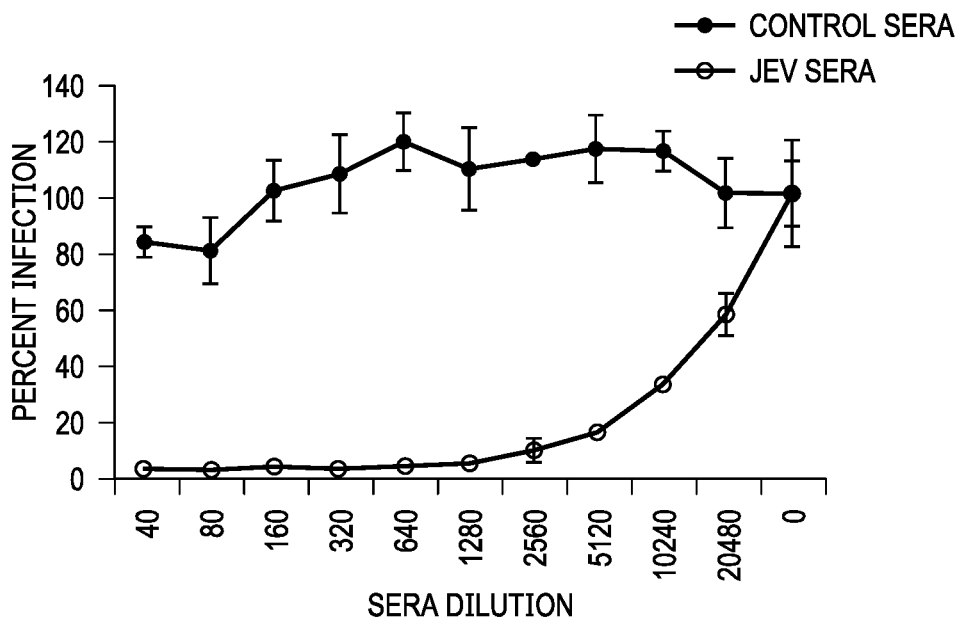
FIGS. 8A to 8D show the neutralization of RVP infection using disease specific sera.
Figure 8B:
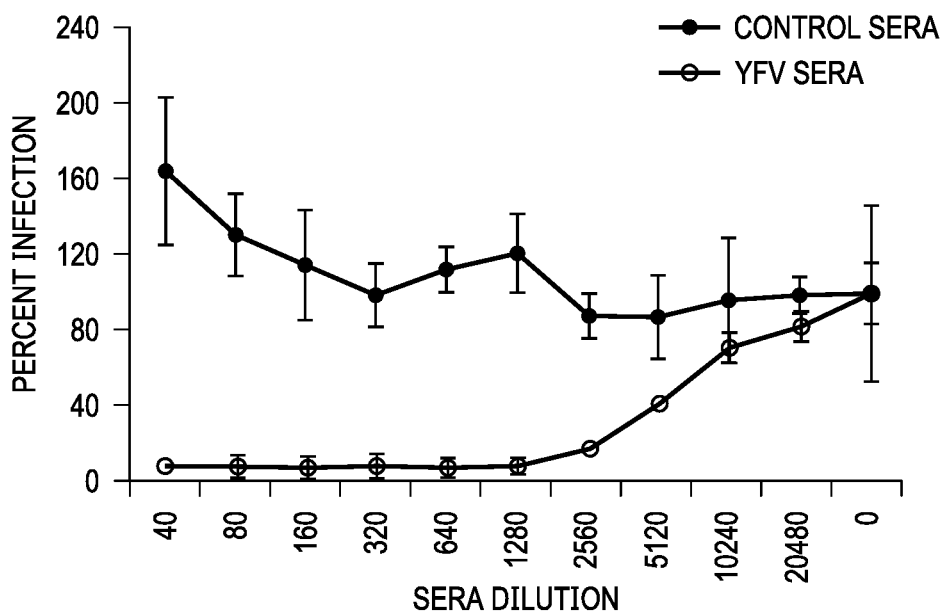
Figure 8C:
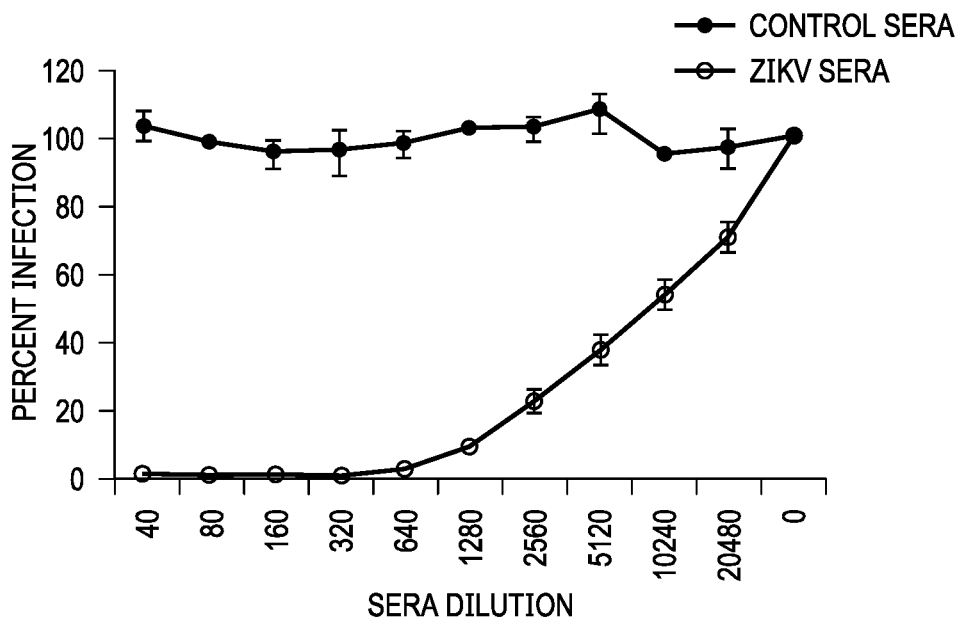
Figure 8D:
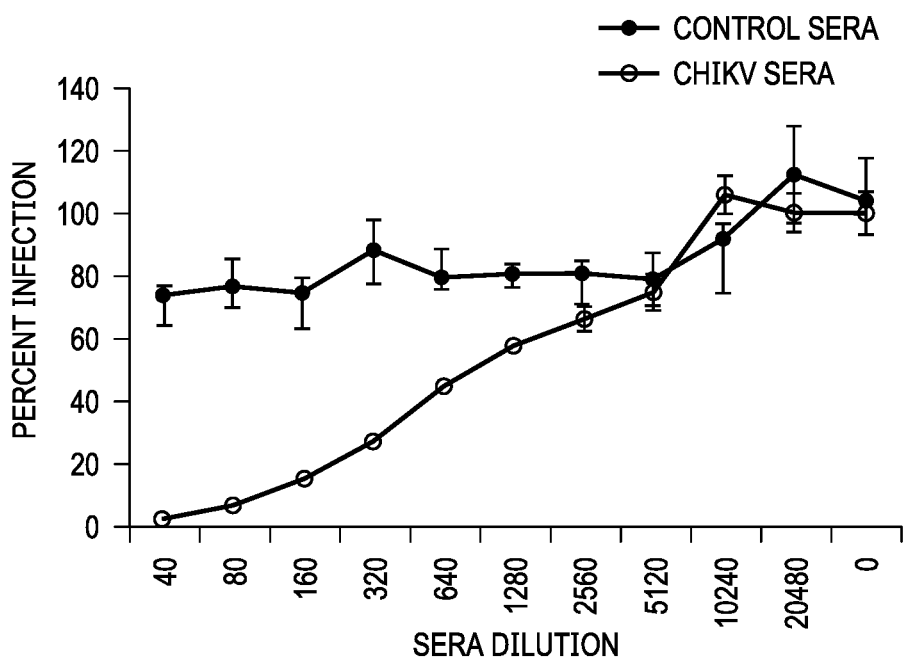

FIGS. 7A to 7D show a strategy for JEV, YFV, Zika and CHIKV RVP generation and titration. FIG. 7A: 293T cells were transfected with JEV CprME expression vector along with the WNV sub-genomic replicon WNRepG/Z. Culture supernatants were harvested 48h post transfection and titrated in Vero cells using two fold dilutions of the virus stock. Number of GFP positive cells were determined 72 hrs post infection using automated microscopy. FIG. 7B: 293T cells were transfected with YFV CprME expression vector along with the WNV sub-genomic replicon WNRepG/Z. Culture supernatants were harvested 48 h post transfection and titrated in Vero cells as above. FIG. 7C: 293T cells were transfected with Zika CprME expression vector along with the WNV sub-genomic replicon WNRepG/Z. Culture supernatants were harvested 48 h post transfection and titrated in Vero cells as above. FIG. 7D: 293T cells were transfected with the CHIKV E3-E2-E1 expression vector along with the HIV NL.Luc R-/E-. Culture supernatants were harvested 48 h post transfection and titrated in Vero cells.

FIGS. 8A to 8D show the neutralization of RVP infection using disease specific sera. Vero cells were infected with FIG. 8A: JEV RVPs, FIG. 8B: YFV RVPs, FIG. 8C: ZIKV RVPs or FIG. 8D: CHIKV RVPs in the presence of serial dilutions of virus specific sera or control sera. Infection was determined 72 hrs post infection via automated microscopy. Data is represented as percent infection normalized to control sera as mean±SD of triplicate observations.

Figures 9A, 9B:
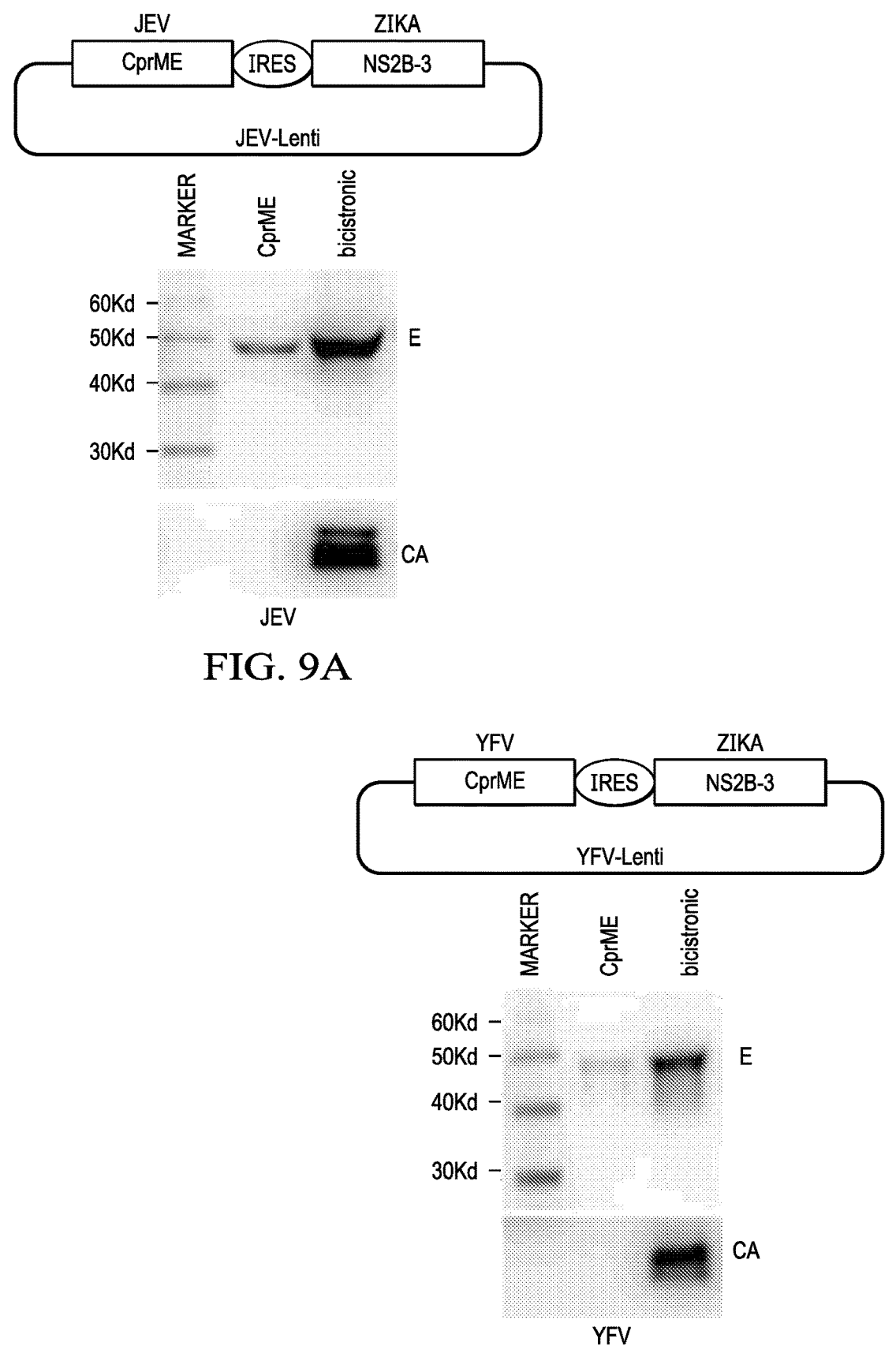

FIGS. 9A to 9C show the generation and characterization of bicistronic lentiviral vectors expressing arboviral structural proteins. FIG. 9A: JEV CprME was cloned into a lentiviral vector that included an IRES sequence followed by the Zika NS2B-3 protease. 293T cells were transfected with the JEV CprME construct alone or the bicistronic JEV lentiviral construct. Culture supernatants were harvested and VLPs analyzed for JEV E protein and Capsid protein secretion via western blotting. FIG. 9B: YFV CprME was cloned into a lentiviral vector as above and VLP secretion determined in the culture supernatants by western blotting for E and Capsid protein. FIG. 9C: CHIKV C-E3-E2-E1 genes were cloned into a lentiviral vector and VLP secretion determined in the culture supernatants by western blotting for E1/E2 protein.

FIGS. 10A to 10C show the generation of stable cell lines secreting JEV, YFV and CHIKV VLPs. 293T cells were transduced with FIG. 10A: JEV, FIG. 10B: YFV, or FIG. 10C: CHKV structural protein containing lentivirus particles. Transduced cells were bulk selected with blasticidin followed by limiting dilution single cell cloning. For each virus, several single cell clones were characterized for Envelope protein staining on the cell surface via flow cytometry and VLP secretion into the culture supernatants via western blotting.

Figure 11A:
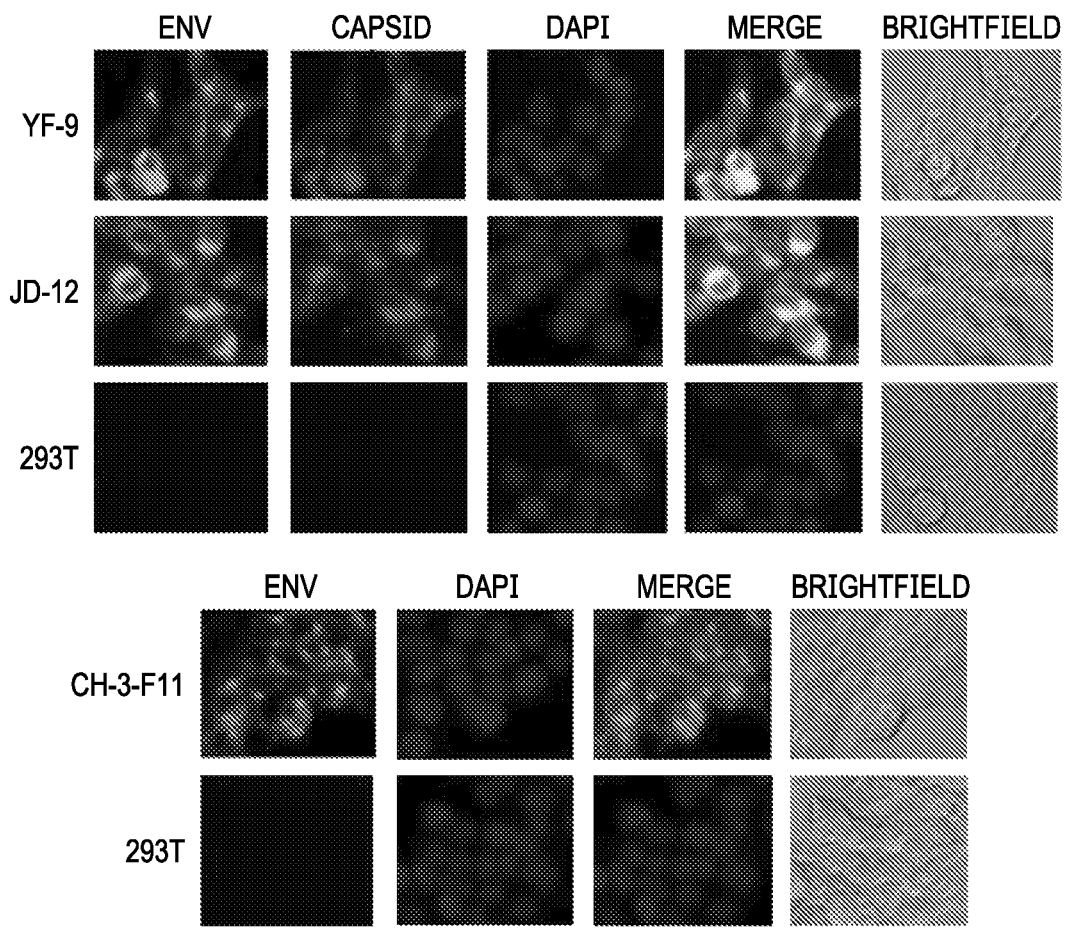
FIGS. 11A and 11B show the characterization of stable single cell clones for Env and capsid protein expression.
Figure 11B:
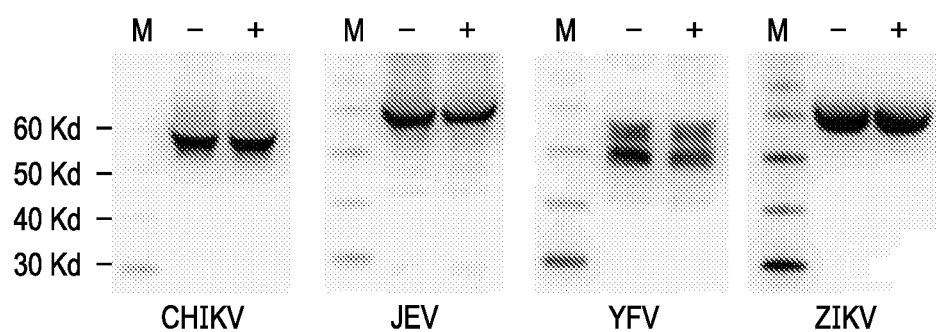

FIGS. 11A and 11B show the characterization of stable single cell clones for Env and capsid protein expression. FIG. 11A: JEV-JD12, YFV-YF9 and CHIKV-CH3 cell lines were stained for E and capsid protein expression. Cells were analyzed by fluorescence microscopy and images acquired. FIG. 11B: the stable cell lines were cultured in the presence or absence of blasticidin for a period of 30 days. Culture supernatants were analyzed for E protein expression by western blotting.

Figure 12A:
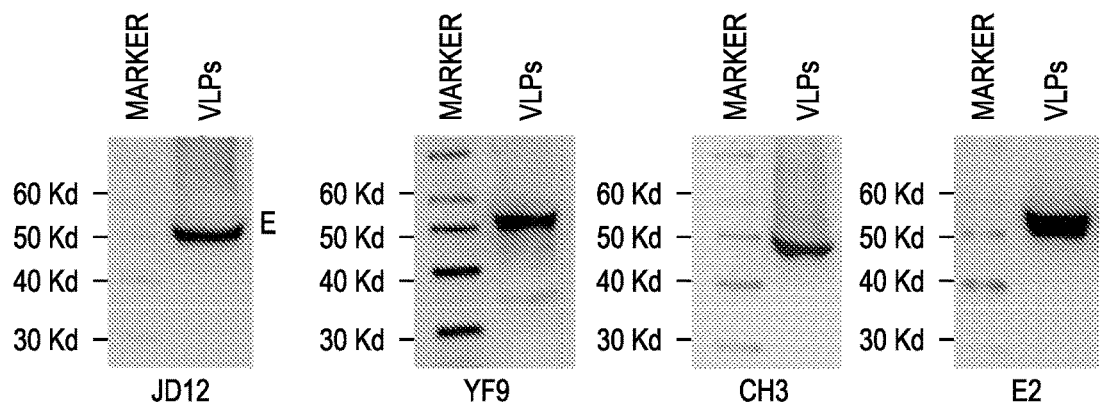
FIGS. 12A and 12B show the VLP purification and schematic of mice immunization studies.
Figure 12B:
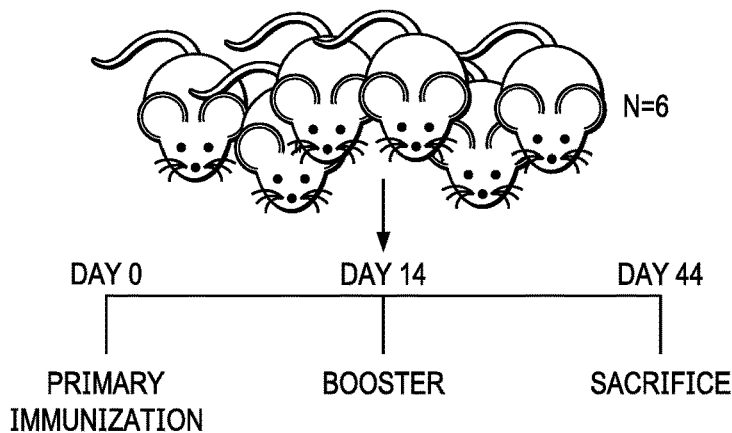
Figure 13C:
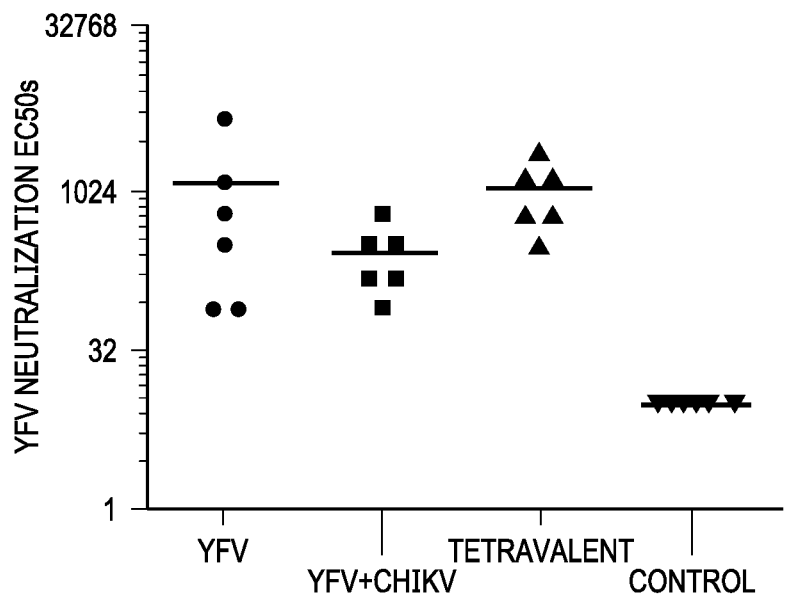
Figure 13D:
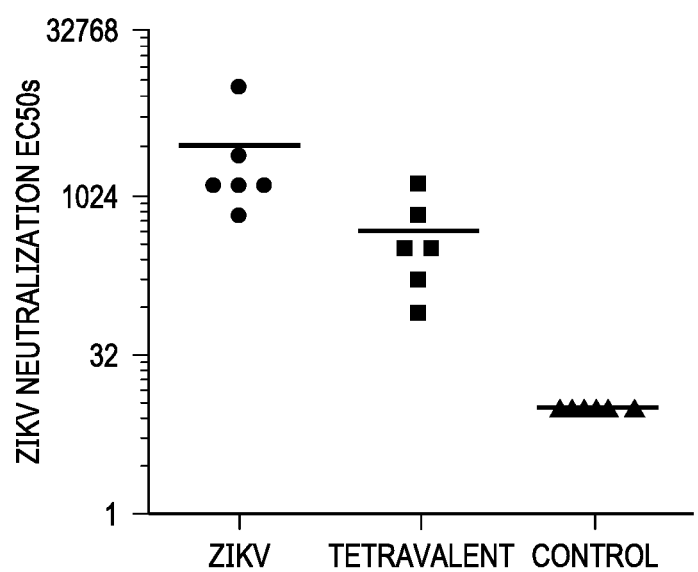

FIGS. 12A and 12B show the VLP purification and schematic of mice immunization studies. FIG. 12A: single cell cultures producing Zika, YFV, CHIKV and JEV VLPs were propagated in 5 layer flasks. Culture supernatants were concentrated via ultracentrifugation, pooled and analyzed for E protein expression via western blot. FIG. 12B: Balb/c mice were divided into 8 groups (N=6 mice/group) and immunized with the monovalent vaccine or different bivalent or tetravalent combinations as depicted in the table. Alum (2% alhydrogel) was used as adjuvant. Mice received a single booster dose at day 14 and were sacrificed at ~44 days post primary immunization.

FIGS. 13A to 13D show the neutralization efficacy of VLP vaccine combinations. Sera obtained from mice immunized with different VLP vaccine combinations were analyzed generation of neutralizing antibody response. Reporter virus based assays were used to determine the efficacy of neutralizing antibodies, curves were fit and EC50 titers determined. Data for (13A) JEV, (13B) CHIKV, (13C) YFV and (13D) ZIKV EC50 titers is shown.

Figures 14A, 14B:
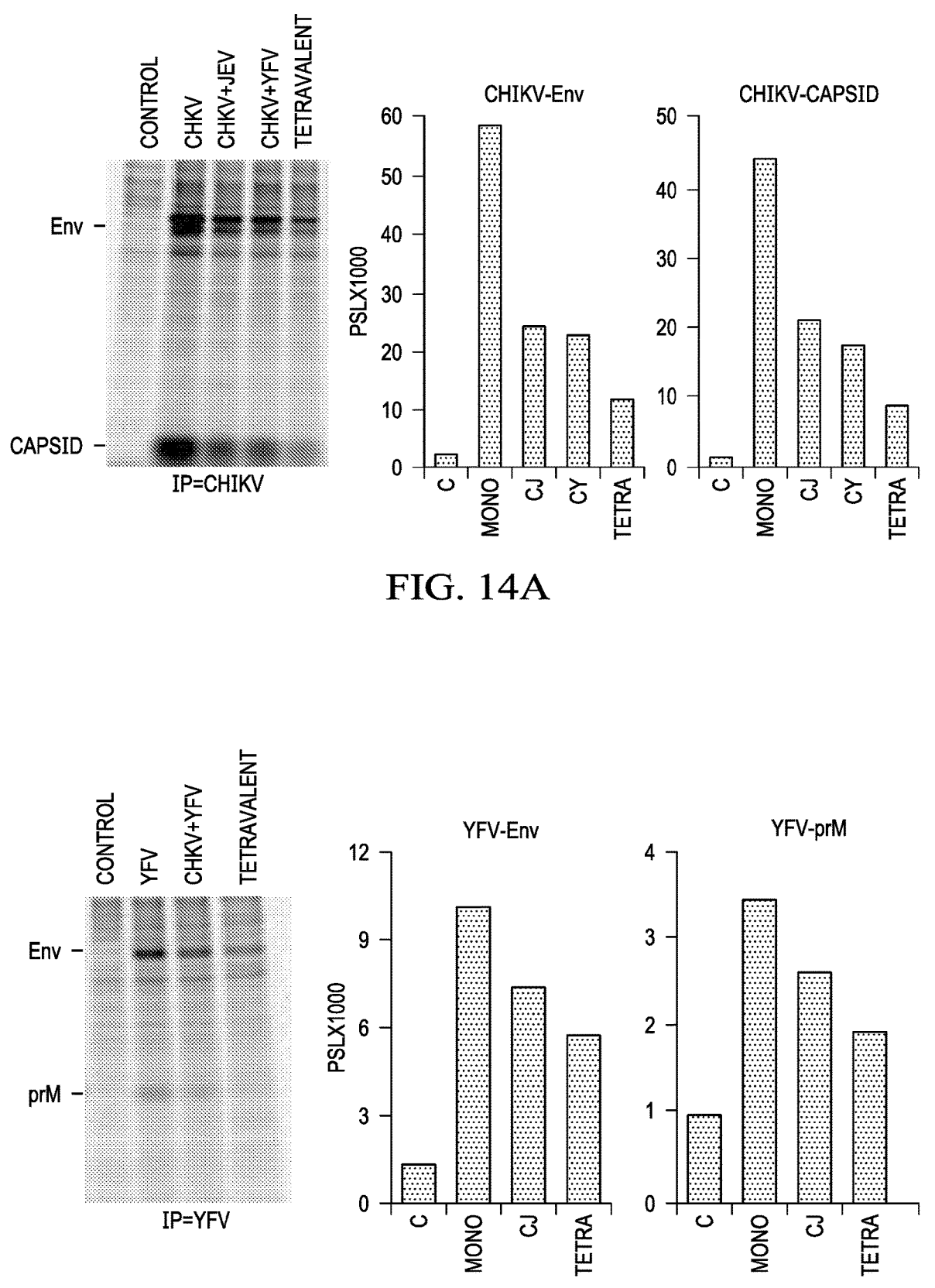
Figure 14C:
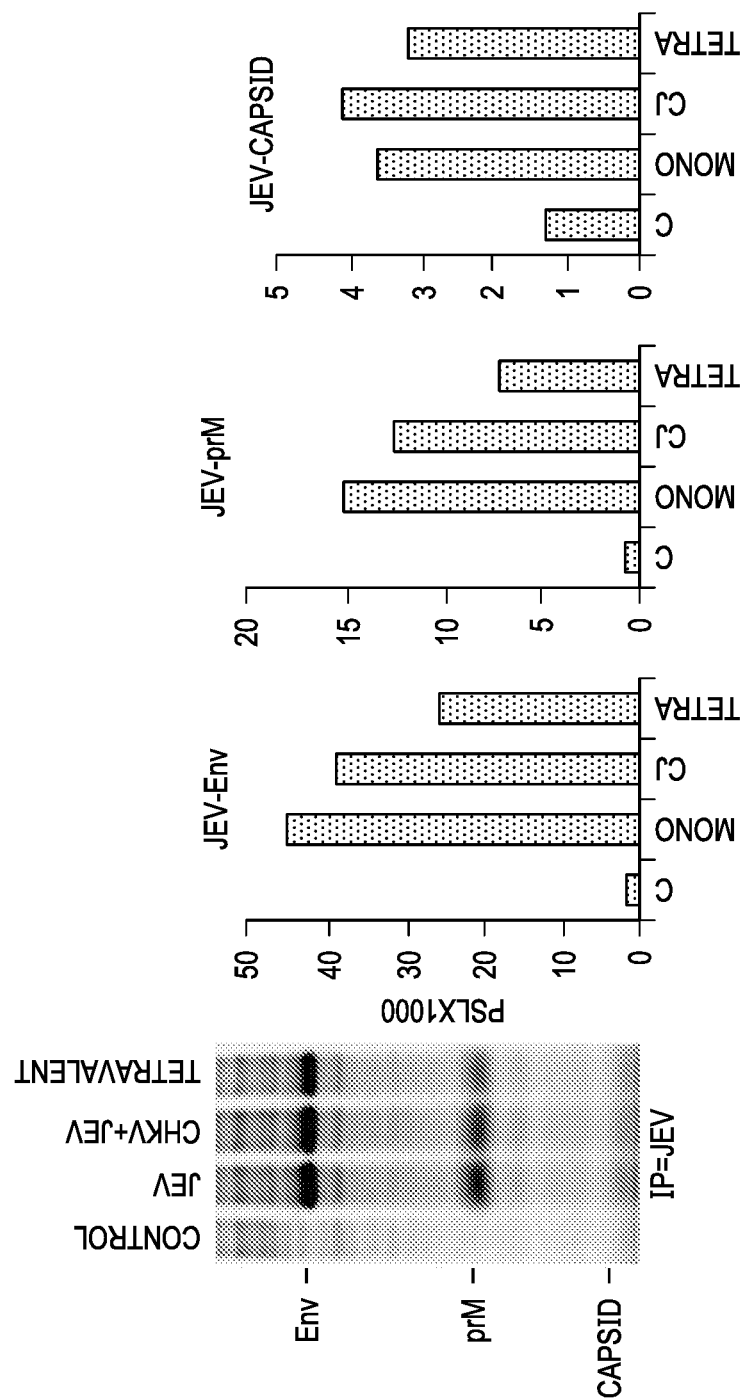
Figure 14D:
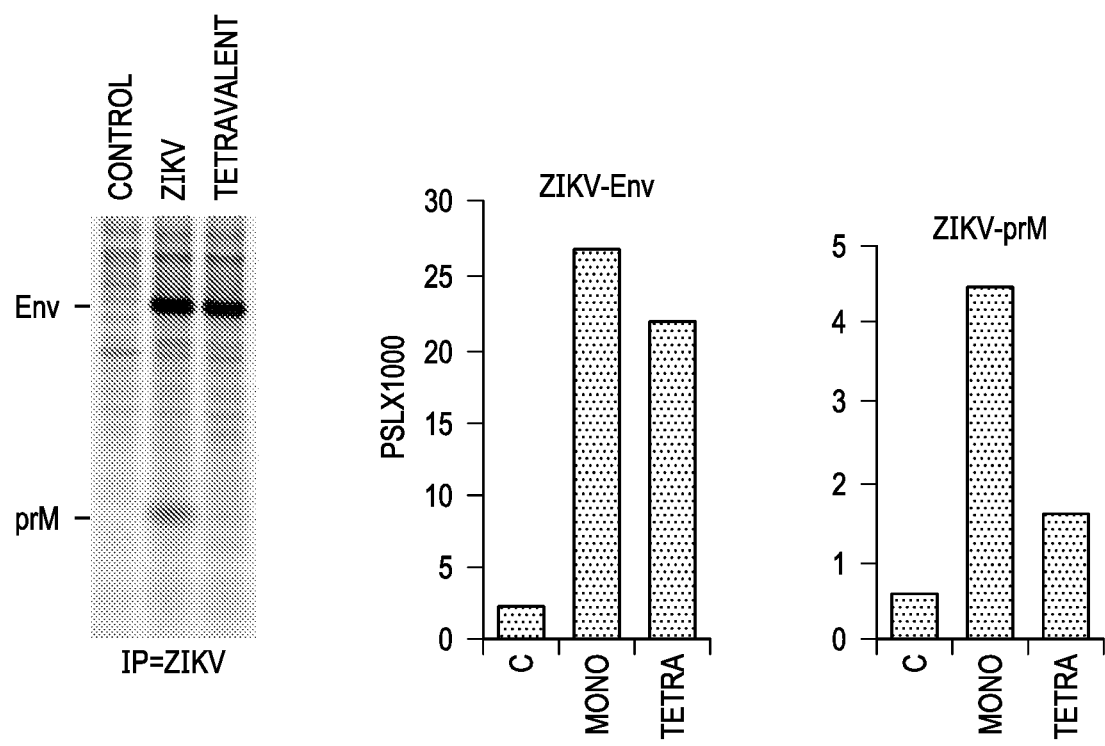

FIGS. 14A to 14D show the quality of antibody response generated in VLP immunized mice. FIG. 14A: CHKV-E3-E2-E1 stable cell line was radiolabeled with [$^{35}$S]Met-Cyst and cell lysates immunoprecipitated with pooled sera from indicated groups of immunized mice. Complexes were resolved on an SDS-PAGE gel followed by fluorography. FIG. 14B: YFV-CprME stable cell line was radiolabeled with [$^{35}$S]Met-Cyst and cell lysates immunoprecipitated with pooled sera from relevant groups of immunized mice. FIG. 14C: JEV-CprME stable cell line was radiolabeled with [$^{35}$S]Met-Cyst and cell lysates immunoprecipitated with pooled sera from indicated groups of immunized mice. FIG. 14D: JEV-CprME stable cell line was radiolabeled with [$^{35}$S]Met-Cyst and cell lysates immunoprecipitated with pooled sera from indicated groups of immunized mice.

Figure 15A:
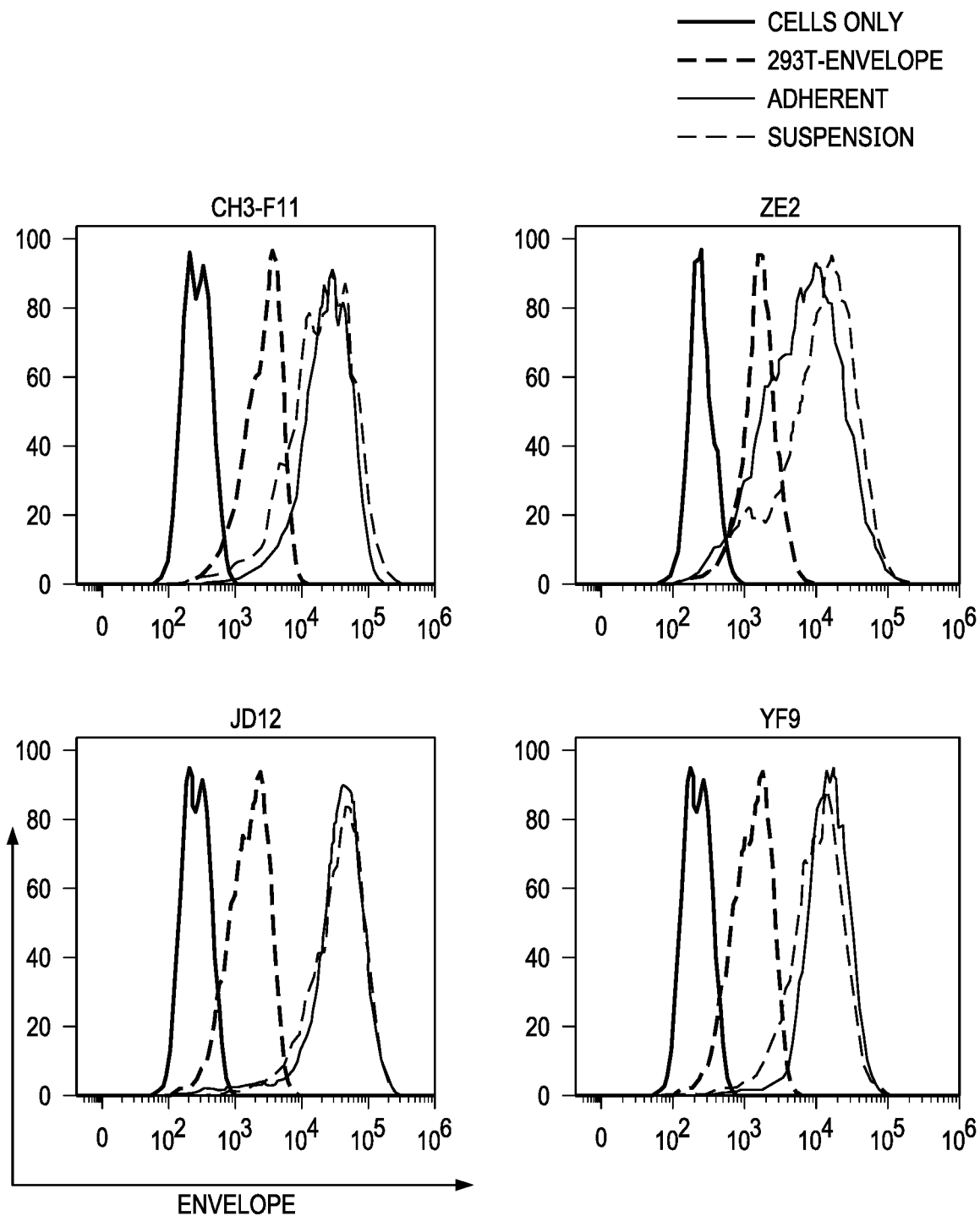
FIGS. 15A to 15C show the adaptation of stable cell lines for growth in suspension culture.
Figure 15B:
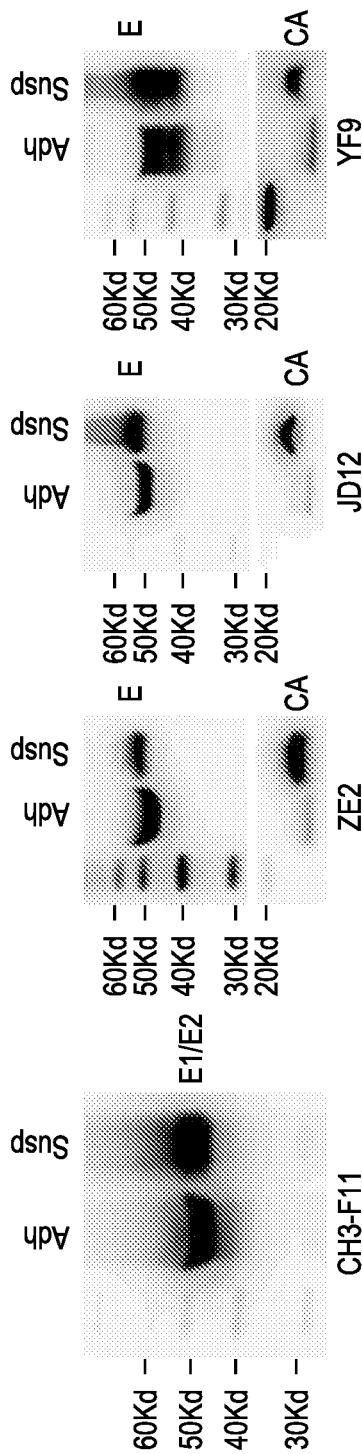
Figure 15C:
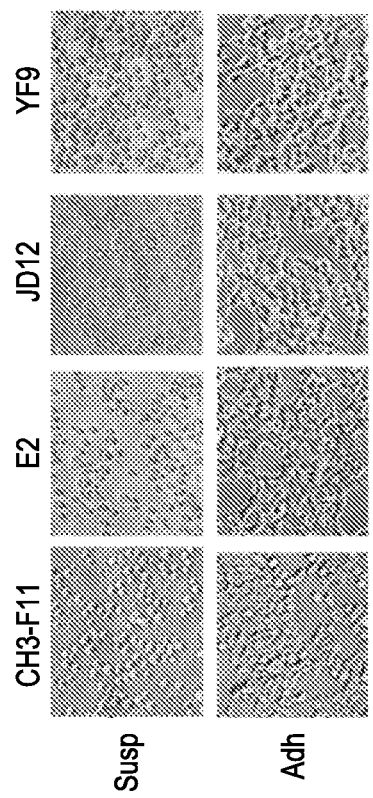

FIGS. 15A to 15C shows the adaptation of stable cell lines for growth in suspension culture. FIG. 15A: JEV, YFV, ZIKV and CHKV stable cell lines were adapted to grow in suspension culture. After complete adaptation, cells were stained for E protein expression via flow cytometry. FIG. 15B: VLP production from the adapted suspension cell lines was determined by western blotting for the E protein. FIG. 15C: Morphology of suspension cell lines via brightfield microscopy and comparison with their adherent counterparts.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only.

As used herein, the term "or combinations thereof" refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A nucleic acid encoding three or more consensus, codon optimized, or both consensus and codon optimized, multivalent flavivirus nucleic acid sequences that each express three or more flavivirus proteins from different flaviviruses inserted into a lentiviral vector capable of forming Virus Like Particles (VLPs) that comprise the three or more different flavivirus proteins and a flavivirus capsid protein, wherein the three or more proteins are selected from three or more different flaviviruses of SEQ ID NOS: 2, 4, 6, or 8; wherein the three or more nucleic acids are inserted into the lentiviral vector; or wherein the nucleic acid is defined further as a vector; or as a bicistronic lentiviral vector.

2. The nucleic acid of claim 1, wherein a cell line makes the three or more virus-specific VLPs, the three or more virus-like VLPs are purified, and then mixed with one or more additional virus VLPs in different combinations to make a multivalent vaccine.

3. The nucleic acid of claim 1, wherein the nucleic acid is transfected into a cell line, a human cell line, or a 293T or Vero cell line; or the nucleic acid is stably transduced in a cell line.

4. The nucleic acid of claim 1, wherein the flavivirus proteins are selected from a flavivirus selected from at least one of: Zika virus, Yellow Fever Virus, Japanese Encephalitis Virus, Dengue 1-4 Virus, Tick Borne Encephalitis Virus, West Nile Virus, St Louis Encephalitis Virus.

5. A method of making multivalent flavivirus Virus Like Particles (VLP) comprising:
   inserting nucleic acids that encode and a flavivirus capsid protein and one of three or more flavivirus or arbovirus proteins from three different flaviviruses or arboviruses into a lentiviral backbone vector, wherein the at least three flavivirus or arbovirus proteins are from different flaviviruses or arboviruses, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector;
   generating a lentivirus by transfecting one or more first cell lines with each of the three or more lentiviral backbone vectors and isolating the lentivirus therefrom;
   transducing a second cell line with each of the three or more lentiviruses;
   culturing the transduced cell lines under conditions in which each of the three or more multivalent flavivirus Virus Like Particles (VLP) are released from the one or more transduced cell lines; and
   isolating the multivalent flavivirus Virus Like Particles (VLP) from a culture supernatant.

6. The method of claim 5, wherein the first, the second, or both the first and second cell line is a human cell line, a 293T, or Vero cell line.

7. The method of claim 5, further comprising generating three or more VLPs that express proteins from different flavivirus, the express proteins from different flavivirus strains, or express proteins from different flavivirus clades, wherein each of the VLPs is made in a different cell lines and a vaccine is prepared by mixing the different VLPs produced by different transduced cell lines.

8. The method of claim 7, wherein the mix of three or more VLPs from different transduced cell lines into region-specific multivalent vaccines, wherein a ratio of different flavivirus VLPs is prepared based on the most prevalent flavivirus for such a region; or wherein the mix of VLPs is trivalent, or tetravalent.

9. The method of claim 7, wherein the mix of three or more VLPs from different transduced cell lines into region-specific multivalent vaccines is the following:
   immunization for a worldwide, a travel, or a military use: Zika, JEV, YFV and Chikungunya virus (CHIKV) (an alphavirus), or YFV and JEV;
   for an Asia or Australia JEV, CHIKV and Zika;
   for a South America or Africa: YFV, CHIKV and Zika; or
   for a pacific region: JEV, CHIKV and Zika.

10. A vaccine comprising a mix of three different isolated and purified multivalent arbovirus Virus Like Particles (VLP) that each comprises a flavivirus capsid protein and at least one structural protein from a virus selected from Japanese Encephalitis Virus (JEV), Chikungunya virus (CHIKV), Yellow Fever Virus (YFV), and Zika virus, wherein the vaccine is a combination of three or more different flaviviral proteins in VLPs from arboviruses and the flavivirus capsid protein, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector.

11. The vaccine of claim 10, wherein the vaccine is trivalent or tetravalent for a flavivirus selected from at least one of: Zika virus, Yellow Fever Virus, Japanese Encephalitis Virus, Dengue1-4 Virus, Tick Borne Encephalitis Virus, West Nile Virus, St Louis Encephalitis Virus; and optionally further comprises one or more vaccines selected from at least one of: influenza A vaccine, an influenza B vaccine, an influenza A (H1N1) vaccine, a hepatitis A vaccine, a hepatitis B vaccine, a haemophilus influenzae Type B (HiB) vaccine, a measles vaccine, a mumps vaccine, a rubella vaccine, a polio vaccine, a human papilloma virus (HPV) vaccine, a tetanus vaccine, a diphtheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

12. The vaccine of claim 10, wherein the mix of VLPs from different transduced cell lines into region-specific multivalent vaccines is the following:
   immunization for a worldwide, a travel, or a military use: Zika, JEV, YFV and CHIKV, or YFV and JEV;
   for an Asia or Australia JEV, CHIKV and Zika;
   for a South America or Africa: YFV, CHIKV and Zika; or
   for a pacific region: JEV, CHIKV and Zika.

13. A cell line transformed with a nucleic acid vector comprising a nucleic acid sequence that is a consensus, a codon optimized, or both a consensus and codon optimized nucleic acid that encodes three or more different multivalent arbovirus proteins from three or more different flaviviruses in a lentiviral vector and a flavivirus capsid protein, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector.

14. A purified multivalent mixture of three or more flavivirus Virus Like Particles (MV-VLP) that each comprising a flavivirus capsid protein and a flavivirus structural protein selected from different flaviviruses and the three or more proteins are expressed from nucleic acids of SEQ ID NO:2, 4, 6, or 8.

15. The purified MV-VLP of claim 14, wherein three or more cell lines that have each been transduced with a lentiviral vector that makes a different virus-like VLP, wherein three or more virus-like VLPs are purified and then mixed in different combinations to make a multivalent vaccine; the MV-VLPs are produced in a stably transduced cell line, a stably transduced human cell line, or a stably transduced 293T or Vero cell line; and optionally the MV-VLPs are isolated from at least one of: a culture supernatant, or the cell lines.

16. The purified MV-VLP of claim 14, further comprising one or more vaccines selected from at least one of: influenza A vaccine, an influenza B vaccine, an influenza A (H1N1) vaccine, a hepatitis A vaccine, a hepatitis B vaccine, a haemophilus influenzae Type B (HiB) vaccine, a measles vaccine, a mumps vaccine, a rubella vaccine, a polio vaccine, a human papilloma virus (HPV) vaccine, a tetanus vaccine, a diphtheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

17. An immunogenic composition comprising three or more multivalent Virus Like Particles (VLP) that each comprise a flavivirus capsid protein and a structural protein selected from each of three or more different viruses selected from Japanese Encephalitis Virus (JEV), Chikungunya virus (CHIKV), Yellow Fever Virus (YFV), and Zika virus, and optionally comprises an adjuvant, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector.

18. The immunogenic composition of claim 17, wherein three cell lines are each transduced with a different lentiviral vector that makes a single virus-like VLP, wherein the three or more VLPs are purified and then mixed in different combinations to make a multivalent vaccine; wherein the composition comprises at least three VLPs comprising different flavivirus E proteins.

19. A method of generating an immune response to three or more different flaviviruses in a subject, the method comprising administering to the subject an effective amount of an immunogenic composition comprising three or more multivalent flavivirus Virus Like Particles (VLP) that comprises a flavivirus capsid protein and at least one structural protein selected from each of three or more different flaviviruses selected from Zika virus, Yellow Fever Virus, Japanese Encephalitis Virus, Dengue1-4 Virus, Tick Borne Encephalitis Virus, West Nile Virus, or St Louis Encephalitis Virus, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector.

20. The method of claim 19, wherein the composition is administered mucosally, intradermally, subcutaneously, intramuscularly, or orally.

21. The method of claim 19, wherein the immune response vaccinates the subject against multiple serotypes or clades of three or more flaviviruses and optionally further comprises one or more vaccines selected from at least one of: influenza A vaccine, an influenza B vaccine, an influenza A (H1N1) vaccine, a hepatitis A vaccine, a hepatitis B vaccine, a haemophilus influenzae Type B (HiB) vaccine, a measles vaccine, a mumps vaccine, a rubella vaccine, a polio vaccine, a human papilloma virus (HPV) vaccine, a tetanus vaccine, a diptheria vaccine, a pertussis vaccine, a bubonic plague vaccine, a yellow fever vaccine, a cholera vaccine, a malaria vaccine, a smallpox vaccine, a pneumococcal vaccine, a rotavirus vaccine, a varicella vaccine or a meningococcus vaccine.

22. A nucleic acid vector comprising a lentiviral vector comprising one or more engineered restriction nuclease sites, a flavivirus capsid protein, and three or more different codon optimized proteins from three or more different flaviviruses, wherein the vector produces three or more multivalent flavivirus Virus Like Particles (MV-VLP) when in a cell, wherein the three or more nucleic acids are selected from at least one of nucleic acid SEQ ID NOS:2, 4, 6, or 8; wherein the three or more nucleic acids are inserted into the lentiviral vector; wherein the three or more nucleic acid are defined further as inserted into a vector or vectors; or wherein at least one of the nucleic acids is defined further as a bicistronic lentiviral vector.

* * * * *

SEQUENCE LISTING

```
<160> NUMBER OF SEQ ID NOS: 8

<210> SEQ ID NO 1
<211> LENGTH: 795
<212> TYPE: PRT
<213> ORGANISM: Japanese encephalitis virus

<400> SEQUENCE: 1

Met Thr Lys Lys Pro Gly Gly Pro Gly Lys Asn Arg Ala Ile Asn Met
1               5                   10                  15

Leu Lys Arg Gly Leu Pro Arg Val Phe Pro Leu Val Gly Val Lys Arg
            20                  25                  30

Val Val Met Ser Leu Leu Asp Gly Arg Gly Pro Val Arg Phe Val Leu
        35                  40                  45

Ala Leu Ile Thr Phe Phe Lys Phe Thr Ala Leu Ala Pro Thr Lys Ala
```

```
                50                  55                  60
Leu Leu Gly Arg Trp Lys Ala Val Glu Lys Ser Val Ala Met Lys His
 65                  70                  75                  80

Leu Thr Ser Phe Lys Arg Glu Leu Gly Thr Leu Ile Asp Ala Val Asn
                 85                  90                  95

Lys Arg Gly Arg Lys Gln Asn Lys Arg Gly Asn Glu Gly Ser Ile
                100                 105                 110

Met Trp Leu Ala Ser Leu Ala Val Val Ile Ala Cys Ala Gly Ala Met
                115                 120                 125

Lys Leu Ser Asn Phe Gln Gly Lys Leu Leu Met Thr Ile Asn Asn Thr
                130                 135                 140

Asp Ile Ala Asp Val Ile Val Ile Pro Thr Ser Lys Gly Glu Asn Arg
145                 150                 155                 160

Cys Trp Val Arg Ala Ile Asp Val Gly Tyr Met Cys Glu Asp Thr Ile
                165                 170                 175

Thr Tyr Glu Cys Pro Lys Leu Thr Met Gly Asn Asp Pro Glu Asp Val
                180                 185                 190

Asp Cys Trp Cys Asp Asn Gln Glu Val Tyr Val Gln Tyr Gly Arg Cys
                195                 200                 205

Thr Arg Thr Arg His Ser Lys Arg Ser Arg Ser Val Ser Val Gln
210                 215                 220

Thr His Gly Glu Ser Ser Leu Val Asn Lys Lys Glu Ala Trp Leu Asp
225                 230                 235                 240

Ser Thr Lys Ala Thr Arg Tyr Leu Met Lys Thr Glu Asn Trp Ile Ile
                245                 250                 255

Arg Asn Pro Gly Tyr Ala Phe Leu Ala Ala Val Leu Gly Trp Met Leu
                260                 265                 270

Gly Ser Asn Asn Gly Gln Arg Val Val Phe Thr Ile Leu Leu Leu Leu
                275                 280                 285

Val Ala Pro Ala Tyr Ser Phe Asn Cys Leu Gly Met Gly Asn Arg Asp
290                 295                 300

Phe Ile Glu Gly Ala Ser Gly Ala Thr Trp Val Asp Leu Val Leu Glu
305                 310                 315                 320

Gly Asp Ser Cys Leu Thr Ile Met Ala Asn Asp Lys Pro Thr Leu Asp
                325                 330                 335

Val Arg Met Ile Asn Ile Glu Ala Ser Gln Leu Ala Glu Val Arg Ser
                340                 345                 350

Tyr Cys Tyr His Ala Ser Val Thr Asp Ile Ser Thr Val Ala Arg Cys
                355                 360                 365

Pro Thr Thr Gly Glu Ala His Asn Glu Lys Arg Ala Asp Ser Ser Tyr
                370                 375                 380

Val Cys Lys Gln Gly Phe Thr Asp Arg Gly Trp Gly Asn Gly Cys Gly
385                 390                 395                 400

Leu Phe Gly Lys Gly Ser Ile Asp Thr Cys Ala Lys Phe Ser Cys Thr
                405                 410                 415

Ser Lys Ala Ile Gly Arg Thr Ile Gln Pro Glu Asn Ile Lys Tyr Glu
                420                 425                 430

Val Gly Ile Phe Val His Gly Thr Thr Thr Ser Glu Asn His Gly Asn
                435                 440                 445

Tyr Ser Ala Gln Val Gly Ala Ser Gln Ala Ala Lys Phe Thr Val Thr
                450                 455                 460

Pro Asn Ala Pro Ser Ile Thr Leu Lys Leu Gly Asp Tyr Gly Glu Val
465                 470                 475                 480
```

Thr Leu Asp Cys Glu Pro Arg Ser Gly Leu Asn Thr Glu Ala Phe Tyr
            485                 490                 495

Val Met Thr Val Gly Ser Lys Ser Phe Leu Val His Arg Glu Trp Phe
            500                 505                 510

His Asp Leu Ala Leu Pro Trp Thr Ser Pro Ser Thr Ala Trp Arg
            515                 520                 525

Asn Arg Glu Leu Leu Met Glu Phe Glu Glu Ala His Ala Thr Lys Gln
            530                 535                 540

Ser Val Val Ala Leu Gly Ser Gln Glu Gly Gly Leu His Gln Ala Leu
545                 550                 555                 560

Ala Gly Ala Ile Val Val Glu Tyr Ser Ser Val Lys Leu Thr Ser
                    565                 570                 575

Gly His Leu Lys Cys Arg Leu Lys Met Asp Lys Leu Ala Leu Lys Gly
            580                 585                 590

Thr Thr Tyr Gly Met Cys Thr Glu Lys Phe Ser Phe Ala Lys Asn Pro
            595                 600                 605

Ala Asp Thr Gly His Gly Thr Val Val Ile Glu Leu Ser Tyr Ser Gly
            610                 615                 620

Ser Asp Gly Pro Cys Lys Ile Pro Ile Val Ser Val Ala Ser Leu Asn
625                 630                 635                 640

Asp Met Thr Pro Val Gly Arg Leu Val Thr Val Asn Pro Phe Val Ala
                    645                 650                 655

Thr Ser Ser Ala Asn Ser Lys Val Leu Val Glu Met Glu Pro Pro Phe
                    660                 665                 670

Gly Asp Ser Tyr Ile Val Val Gly Arg Gly Asp Lys Gln Ile Asn His
            675                 680                 685

His Trp His Lys Ala Gly Ser Thr Leu Gly Lys Ala Phe Ser Thr Thr
            690                 695                 700

Leu Lys Gly Ala Gln Arg Leu Ala Ala Leu Gly Asp Thr Ala Trp Asp
705                 710                 715                 720

Phe Gly Ser Ile Gly Gly Val Phe Asn Ser Ile Gly Lys Ala Val His
                    725                 730                 735

Gln Val Phe Gly Gly Ala Phe Arg Thr Leu Phe Gly Gly Met Ser Trp
                    740                 745                 750

Ile Thr Gln Gly Leu Met Gly Ala Leu Leu Leu Trp Met Gly Val Asn
            755                 760                 765

Ala Arg Asp Arg Ser Ile Ala Leu Ala Phe Leu Ala Thr Gly Gly Val
            770                 775                 780

Leu Val Phe Leu Ala Thr Asn Val His Ala Asp
785                 790                 795

<210> SEQ ID NO 2
<211> LENGTH: 2385
<212> TYPE: DNA
<213> ORGANISM: Japanese encephalitis virus

<400> SEQUENCE: 2
atgaccaaga agccaggcgg ccctggcaag aacagggcca tcaatatgct gaagagggga      60
ctgccccgcg tgttccctct ggtgggcgtg aagcgcgtgg tcatgagcct gctggacggc     120
agaggccccg tgcggtttgt gctggccctg atcacattct ttaagttcac cgccctggca     180
ccaacaaagg ccctgctggg ccggtggaag gcagtggaga agtctgtggc catgaagcac     240
ctgaccagct ttaagagaga gctgggcaca ctgatcgatg ccgtgaacaa gaggggccgc     300

```
aagcagaaca agaggggcgg caatgagggc tctatcatgt ggctggccag cctggcagtg    360
gtcatcgcat gcgcaggagc catgaagctg tctaacttcc agggcaagct gctgatgaca    420
atcaacaata ccgacatcgc cgatgtgatc gtgatcccca cctccaaggg cgagaatagg    480
tgttgggtgc gcgccatcga cgtgggctac atgtgcgagg atacaatcac ctatgagtgt    540
cccaagctga ccatgggcaa cgaccctgag gacgtggatt gctggtgtga taatcaggag    600
gtgtacgtgc agtatggccg gtgcacacgg accagacaca gcaagagatc ccggagatct    660
gtgagcgtgc agacccacgg agagagctcc ctggtgaaca gaaggaggc ctggctggac     720
agcacaaagg ccaccaggta cctgatgaag acagagaact ggatcatccg caatcccggc    780
tatgcctttc tggccgccgt gctgggatgg atgctgggct ccaacaatgg ccagagggtg    840
gtgttcacca tcctgctgct gctggtggcc cctgcctatt cttttaactg cctgggcatg    900
ggcaataggg atttcatcga gggagcatcc ggagcaacct gggtggacct ggtgctggag    960
ggcgattctt gtctgaccat catggccaac gacaagccaa cactggatgt gaggatgatc    1020
aatatcgagg catctcagct ggcagaggtg cgcagctact gctatcacgc cagcgtgaca    1080
gacatctcca ccgtggcaag gtgtccaacc acaggagagg cccacaacga aagagagcc     1140
gactctagct acgtgtgcaa gcagggcttt accgatcggg gctggggaaa tggatgtgga    1200
ctgtttggca agggcagcat cgataccctgc gccaagttct cttgtacaag caaggccatc    1260
ggcagaacca tccagcctga gaacatcaag tacgaagtgg catctttgt gcacggcacc     1320
acaacctccg agaaccacgg caattattcc gcccaagtgg agcatctca ggcagcaaag     1380
ttcacagtga cccctaacgc cccatctatc accctgaagc tgggcgacta cggcgaggtg    1440
acactggatt gcgagccacg gagcggcctg aatacagagg ccttttatgt gatgaccgtg    1500
ggctccaagt cttttctggt gcacagagag tggttccacg acctggccct gccatggacc    1560
agcccctcct ctacagcctg gaggaatcgc gagctgctga tggagttcga ggaggcacac    1620
gcaaccaagc agagcgtggt ggccctgggc tcccaggagg aggactgca ccaggccctg    1680
gcaggagcca tcgtggtgga gtacagctcc tctgtgaagc tgaccagcgg ccacctgaag    1740
tgccggctga gatggacaa gctggccctg aagggcacaa cctatggcat gtgcacagag     1800
aagttctcct ttgccaagaa ccctgccgat acaggccacg gcaccgtggt catcgagctg    1860
agctactccg gctctgacgg ccccttgtaag atcccaatcg tgtccgtggc ctctctgaat    1920
gatatgacac cagtgggcag actggtgacc gtgaaccct ttgtggccac aagctccgcc     1980
aatagcaagg tgctggtgga gatggagccc ccttttcggcg actcctacat cgtggtgggc    2040
aggggcgata agcagatcaa ccaccactgg cacaaggcag gctccaccct gggcaaggcc    2100
ttctctacaa ccctgaaggg cgcccagcgc ctggccgccc tgggcgacac agcctgggat    2160
tttggcagca tcggcggcgt gttcaattcc atcggcaagg cagtgcacca ggtgttcgga    2220
ggagcctttc ggaccctgtt cggaggcatg agctggatca cacagggact gatgggcgcc    2280
ctgctgctgt ggatgggcgt gaacgcccgg gacagatcca tcgccctggc ctttctggca    2340
accggaggcg tgctggtgtt cctggccaca aatgtgcacg ccgat                    2385
```

<210> SEQ ID NO 3
<211> LENGTH: 761
<212> TYPE: PRT
<213> ORGANISM: Artificial Sequence
<220> FEATURE:
<223> OTHER INFORMATION: Synthetic peptide

<400> SEQUENCE: 3

-continued

```
Met Ala Thr Thr Met Ser Trp Pro Ser Glu Val Leu Thr Ala Val
1               5                   10                  15

Gly Leu Ile Cys Ala Leu Ala Gly Gly Phe Ala Lys Ala Asp Ile Glu
            20                  25                  30

Met Ala Gly Pro Met Ala Ala Val Gly Leu Leu Ile Val Ser Tyr Val
            35                  40                  45

Val Ser Gly Lys Ser Val Asp Met Tyr Ile Glu Arg Ala Gly Asp Ile
        50                  55                  60

Thr Trp Glu Lys Asp Ala Glu Val Thr Gly Asn Ser Pro Arg Leu Asp
65                  70                  75                  80

Val Ala Leu Asp Glu Ser Gly Asp Phe Ser Leu Val Glu Asp Asp Gly
                85                  90                  95

Pro Pro Met Arg Glu Ile Ile Leu Lys Val Val Leu Met Thr Ile Cys
            100                 105                 110

Gly Met Asn Pro Ile Ala Ile Pro Phe Ala Ala Gly Ala Trp Tyr Val
        115                 120                 125

Tyr Val Lys Thr Gly Lys Arg Ser Gly Ala Leu Trp Asp Val Pro Ala
        130                 135                 140

Pro Lys Glu Val Lys Lys Gly Glu Thr Thr Asp Gly Val Tyr Arg Val
145                 150                 155                 160

Met Thr Arg Arg Leu Leu Gly Ser Thr Gln Val Gly Val Gly Val Met
            165                 170                 175

Gln Glu Gly Val Phe His Thr Met Trp His Val Thr Lys Gly Ser Ala
            180                 185                 190

Leu Arg Ser Gly Glu Gly Arg Leu Asp Pro Tyr Trp Gly Asp Val Lys
        195                 200                 205

Gln Asp Leu Val Ser Tyr Cys Gly Pro Trp Lys Leu Asp Ala Ala Trp
        210                 215                 220

Asp Gly His Ser Glu Val Gln Leu Leu Ala Val Pro Pro Gly Glu Arg
225                 230                 235                 240

Ala Arg Asn Ile Gln Thr Leu Pro Gly Ile Phe Lys Thr Lys Asp Gly
            245                 250                 255

Asp Ile Gly Ala Val Ala Leu Asp Tyr Pro Ala Gly Thr Ser Gly Ser
            260                 265                 270

Pro Ile Leu Asp Lys Cys Gly Arg Val Ile Gly Leu Tyr Gly Asn Gly
        275                 280                 285

Val Val Ile Lys Asn Gly Ser Tyr Val Ser Ala Ile Thr Gln Gly Arg
        290                 295                 300

Arg Glu Glu Glu Thr Pro Val Glu Cys Phe Glu Pro Ser Met Leu Lys
305                 310                 315                 320

Lys Lys Gln Leu Thr Val Leu Asp Leu His Pro Gly Ala Gly Lys Thr
            325                 330                 335

Arg Arg Val Leu Pro Glu Ile Val Arg Glu Ala Ile Lys Thr Arg Leu
            340                 345                 350

Arg Thr Val Ile Leu Ala Pro Thr Arg Val Val Ala Ala Glu Met Glu
            355                 360                 365

Glu Ala Leu Arg Gly Leu Pro Val Arg Tyr Met Thr Thr Ala Val Asn
        370                 375                 380

Val Thr His Ser Gly Thr Glu Ile Val Asp Leu Met Cys His Ala Thr
385                 390                 395                 400

Phe Thr Ser Arg Leu Leu Gln Pro Ile Arg Val Pro Asn Tyr Asn Leu
            405                 410                 415
```

Tyr Ile Met Asp Glu Ala His Phe Thr Asp Pro Ser Ser Ile Ala Ala
                420                 425                 430

Arg Gly Tyr Ile Ser Thr Arg Val Glu Met Gly Glu Ala Ala Ala Ile
            435                 440                 445

Phe Met Thr Ala Thr Pro Pro Gly Thr Arg Asp Ala Phe Pro Asp Ser
    450                 455                 460

Asn Ser Pro Ile Met Asp Thr Glu Val Glu Val Pro Glu Arg Ala Trp
465                 470                 475                 480

Ser Ser Gly Phe Asp Trp Val Thr Asp His Ser Gly Lys Thr Val Trp
                485                 490                 495

Phe Val Pro Ser Val Arg Asn Gly Asn Glu Ile Ala Ala Cys Leu Thr
            500                 505                 510

Lys Ala Gly Lys Arg Val Ile Gln Leu Ser Arg Lys Thr Phe Glu Thr
    515                 520                 525

Glu Phe Gln Lys Thr Lys His Gln Glu Trp Asp Phe Val Val Thr Thr
530                 535                 540

Asp Ile Ser Glu Met Gly Ala Asn Phe Lys Ala Asp Arg Val Ile Asp
545                 550                 555                 560

Ser Arg Arg Cys Leu Lys Pro Val Ile Leu Asp Gly Glu Arg Val Ile
                565                 570                 575

Leu Ala Gly Pro Met Pro Val Thr His Ala Ser Ala Ala Gln Arg Arg
            580                 585                 590

Gly Arg Ile Gly Arg Asn Pro Asn Lys Pro Gly Asp Glu Tyr Leu Tyr
    595                 600                 605

Gly Gly Gly Cys Ala Glu Thr Asp Glu Asp His Ala His Trp Leu Glu
610                 615                 620

Ala Arg Met Leu Leu Asp Asn Ile Tyr Leu Gln Asp Gly Leu Ile Ala
625                 630                 635                 640

Ser Leu Tyr Arg Pro Glu Ala Asp Lys Val Ala Ala Ile Glu Gly Glu
                645                 650                 655

Phe Lys Leu Arg Thr Glu Gln Arg Lys Thr Phe Val Glu Leu Met Lys
            660                 665                 670

Arg Gly Asp Leu Pro Val Trp Leu Ala Tyr Gln Val Ala Ser Ala Gly
    675                 680                 685

Ile Thr Tyr Thr Asp Arg Arg Trp Cys Phe Asp Gly Thr Thr Asn Asn
690                 695                 700

Thr Ile Met Glu Asp Ser Val Pro Ala Glu Val Trp Thr Arg His Gly
705                 710                 715                 720

Glu Lys Arg Val Leu Lys Pro Arg Trp Met Asp Ala Arg Val Cys Ser
                725                 730                 735

Asp His Ala Ala Leu Lys Ser Phe Lys Glu Phe Ala Ala Gly Lys Arg
            740                 745                 750

Tyr Pro Tyr Asp Val Pro Asp Tyr Ala
    755                 760

<210> SEQ ID NO 4
<211> LENGTH: 2882
<212> TYPE: DNA
<213> ORGANISM: Artificial Sequence
<220> FEATURE:
<223> OTHER INFORMATION: Synthetic primer

<400> SEQUENCE: 4
ctcgaggccc ctctccctcc ccccccccta acgttactgg ccgaagccgc ttggaataag     60
gccggtgtgc gtttgtctat atgttatttt ccaccatatt gccgtctttt ggcaatgtga    120

```
gggcccggaa acctggccct gtcttcttga cgagcattcc tagggtctt tccctctcg      180 ccaaaggaat gcaaggtctg ttgaatgtcg tgaaggaagc agttcctctg gaagcttctt   240
gaagacaaac aacgtctgta gcgacccttt gcaggcagcg aacccccca cctggcgaca    300 ggtgcctctg cggccaaaag ccacgtgtat aagatacacc tgcaaaggcg gcacaaccc   360 agtgccacgt tgtgagttgg atagttgtgg aaagagtcaa atggctctcc tcaagcgtat   420
tcaacaaggg gctgaaggat gcccagaagg tacccattg tatgggatct gatctggggc   480
ctcggtacac atgctttaca tgtgtttagt cgaggttaaa aaacgtcta ggccccccga    540 accacgggga cgtggttttc ctttgaaaaa cacgatgata tatggccac aaccatgagc    600 tggccacctt ctgaggtgct gacagcagtg ggcctgatct gtgcactggc aggaggattc   660
gcaaaggcag acatcgagat ggcaggacca atggcagcag tgggcctgct gatcgtgagc   720
tacgtggtgt ctggcaagag cgtggacatg tatatcgaga gggccggcga catcacctgg   780
gagaaggacg ccgaggtgac aggaaaactcc cctcgcctgg acgtggccct ggatgagagc   840
ggcgacttct ccctggtgga ggacgatggc ccacccatgc gcgagatcat cctgaaggtg   900
gtgctgatga ccatctgcgg catgaatcca atcgcaatcc cctttgccgc aggagcatgg   960
tacgtgtatg tgaagacagg caagcggtct ggcgccctgt gggatgtgcc agcaccaaag  1020
gaggtgaaga agggcgagac aacagacggc gtgtacagag tgatgacccg agactgctg   1080 ggcagcacac aagtgggagt gggcgtgatg caggagggcg tgtttcacac catgtggcac  1140
gtgacaaagg gctctgccct gaggagcgga gagggccgcc tggacccata ctggggcgat  1200
gtgaagcagg acctggtgtc ctattgtgga ccatggaagc tggatgcagc atgggacgga  1260
cactctgagg tgcagctgct ggcagtgcct ccaggagaga gggccagaaa catccagacc  1320
ctgcccggca tcttcaagac aaaggacggc gacatcggag cagtggccct ggattaccct  1380
gcaggcacct ctggcagccc aatcctggac aagtgcggca gagtgatcgg cctgtacggc  1440
aacggcgtgg tcatcaagaa tggctcctac gtgagcgcca tcacccaggg caggcgcgag  1500
gaggagacac ctgtggagtg ttttgagccc tccatgctga agaagaagca gctgaccgtg  1560
ctggatctgc acccaggagc aggcaagaca aggagagtgc tgcctgagat cgtgagggag  1620
gccatcaaga ccaggctgag gacagtgatc ctggcaccaa ccagggtggt ggcagcagag  1680
atggaggagg ccctgcgggg cctgcctgtg agatacatga ccacagccgt gaacgtgacc  1740
cacagcggca cagagatcgt ggacctgatg tgccacgcca ccttcacatc caggctgctg  1800
cagcctatcc gcgtgccaaa ctacaatctg tatatcatgg atgaggccca ctttaccgac  1860
ccaagctcca tcgcagcaag gggatatatc tccacaagag tggagatggg cgaggctgcc  1920
gccatcttca tgaccgcaac accacctgga accaggatg cctttcccga ctccaattct  1980
cctatcatgg acacagaggt ggaggtgcca gagagggcat ggtctagcgg cttcgattgg  2040
gtgaccgacc actccggcaa gacagtgtgg tttgtgccct ctgtgagaaa cggcaatgag  2100
atcgccgcct gtctgaccaa ggccggcaag agagtgatcc agctgagccg caagaccttc  2160
gagacagagt ttcagaagac aaagcaccag gagtgggatt cgtggtgac cacagacatc  2220 agcgagatgg gcgccaactt taaggccgat agagtgatcg actccaggcg ctgcctgaag  2280
cctgtgatcc tggatggcga gagagtgatc ctggcaggac ctatgccagt gacccacgca  2340
tccgccgcac agaggagagg ccggatcgga gaaaccccca ataagcctgg cgacgagtac  2400
ctgtatggcg gcggctgtgc cgagacagac gaggatcacg cacactggct ggaggcaagg  2460
```

-continued

```
atgctgctgg ataatatcta cctgcaggac ggcctgatcg ccagcctgta tagacctgag    2520
gccgataagg tggccgccat cgagggcgag ttcaagctgc ggaccgagca gagaaagaca    2580
tttgtggagc tgatgaagag gggcgacctg ccagtgtggc tggcatacca ggtggcatct    2640
gccggcatca cctatacaga taggcgctgg tgcttcgacg caccacaaa caataccatc     2700 atggaggaca gcgtgcctgc cgaagtgtgg acaaggcacg gcgagaagcg cgtgctgaag    2760
ccacggtgga tggatgcacg ggtgtgctct gaccacgccg ccctgaagag cttcaaggag    2820
tttgccgccg gcaagagata tccctacgat gtccctgatt acgcataacc gcgggtttaa    2880
ac                                                                    2882
```

<210> SEQ ID NO 5
<211> LENGTH: 779
<212> TYPE: PRT
<213> ORGANISM: Yellow fever virus

<400> SEQUENCE: 5

```
Met Ser Gly Arg Lys Ala Gln Gly Arg Thr Leu Gly Val Asn Met Val
1               5                   10                  15

Arg Arg Gly Val Arg Ser Leu Ser Asn Lys Ile Lys Gln Lys Thr Lys
            20                  25                  30

Gln Ile Gly Asn Arg Pro Gly Pro Ser Arg Gly Val Gln Gly Phe Ile
        35                  40                  45

Phe Phe Phe Leu Phe Asn Ile Leu Thr Gly Lys Lys Leu Thr Ala His
    50                  55                  60

Leu Lys Lys Leu Trp Arg Met Leu Asp Pro Arg Gln Gly Leu Ala Val
65                  70                  75                  80

Leu Arg Lys Val Lys Arg Val Val Ala Ser Leu Met Arg Gly Leu Ala
                85                  90                  95

Ser Arg Lys Arg Arg Ser Asn Glu Met Ala Met Val Pro Leu Leu Leu
            100                 105                 110

Leu Gly Leu Leu Ala Leu Ser Gly Gly Val Thr Leu Val Arg Lys Asn
        115                 120                 125

Arg Trp Leu Leu Leu Asn Val Thr Ala Glu Asp Leu Gly Lys Thr Phe
    130                 135                 140

Ser Val Gly Thr Gly Asn Cys Thr Thr Asn Ile Leu Glu Ala Lys Tyr
145                 150                 155                 160

Trp Cys Pro Asp Ser Met Glu Tyr Asn Cys Pro Asn Leu Ser Pro Arg
                165                 170                 175

Glu Glu Pro Asp Asp Ile Asp Cys Trp Cys Tyr Gly Val Glu Asn Val
            180                 185                 190

Arg Val Ala Tyr Gly Arg Cys Asp Ala Val Gly Arg Ser Lys Arg Ser
        195                 200                 205

Arg Arg Ala Ile Asp Leu Pro Thr His Glu Asn His Gly Leu Lys Thr
    210                 215                 220

Arg Gln Glu Lys Trp Met Thr Gly Arg Met Gly Glu Arg Gln Leu Gln
225                 230                 235                 240

Lys Ile Glu Arg Trp Leu Val Arg Asn Pro Phe Phe Ala Val Thr Ala
                245                 250                 255

Leu Ala Ile Ala Tyr Leu Val Gly Asn Asn Thr Gln Arg Val Val
            260                 265                 270

Ile Ala Leu Leu Val Leu Ala Val Gly Pro Ala Tyr Ser Ala His Cys
        275                 280                 285

Ile Gly Ile Thr Asp Arg Asp Phe Ile Glu Gly Val His Gly Gly Thr
```

-continued

```
              290                 295                 300
Trp Val Ser Ala Thr Leu Glu Gln Asp Lys Cys Val Thr Val Met Ala
305                 310                 315                 320

Pro Asp Lys Pro Ser Leu Asp Ile Ser Leu Gln Thr Val Ala Ile Asp
                325                 330                 335

Gly Pro Ala Glu Ala Arg Lys Val Cys Tyr Ser Ala Val Leu Thr His
                340                 345                 350

Val Lys Ile Asn Asp Lys Cys Pro Ser Thr Gly Glu Ala His Leu Ala
                355                 360                 365

Glu Glu Asn Asp Gly Asp Asn Ala Cys Lys Arg Thr Tyr Ser Asp Arg
370                 375                 380

Gly Trp Gly Asn Gly Cys Gly Leu Phe Gly Lys Gly Ser Ile Val Ala
385                 390                 395                 400

Cys Ala Lys Phe Thr Cys Ala Lys Ser Met Ser Leu Phe Glu Val Asp
                405                 410                 415

Gln Thr Lys Ile Gln Tyr Val Ile Arg Ala Gln Leu His Val Gly Ala
                420                 425                 430

Lys Gln Glu Asn Trp Asn Thr Asp Ile Lys Thr Leu Lys Phe Asp Ala
                435                 440                 445

Leu Ser Gly Ser Gln Glu Ala Glu Phe Thr Gly Tyr Gly Lys Ala Thr
                450                 455                 460

Leu Glu Cys Gln Val Gln Thr Ala Val Asp Phe Gly Asn Ser Tyr Ile
465                 470                 475                 480

Ala Glu Met Glu Lys Asp Ser Trp Ile Val Asp Arg Gln Trp Ala Gln
                485                 490                 495

Asp Leu Thr Leu Pro Trp Gln Ser Gly Ser Gly Ile Trp Arg Glu
                500                 505                 510

Met His His Leu Val Glu Phe Glu Pro Pro His Ala Ala Thr Ile Arg
                515                 520                 525

Val Leu Ala Leu Gly Asn Gln Glu Gly Ser Leu Lys Thr Ala Leu Thr
                530                 535                 540

Gly Ala Met Arg Val Thr Lys Asp Glu Asn Asp Asn Asn Leu Tyr Lys
545                 550                 555                 560

Leu His Gly Gly His Val Ser Cys Arg Val Lys Leu Ser Ala Leu Thr
                565                 570                 575

Leu Lys Gly Thr Ser Tyr Lys Met Cys Thr Asp Lys Met Ser Phe Val
                580                 585                 590

Lys Asn Pro Thr Asp Thr Gly His Gly Thr Val Val Met Gln Val Lys
                595                 600                 605

Val Pro Lys Gly Ala Pro Cys Lys Ile Pro Val Ile Val Ala Asp Asp
                610                 615                 620

Leu Thr Ala Ala Val Asn Lys Gly Ile Leu Val Thr Val Asn Pro Ile
625                 630                 635                 640

Ala Ser Thr Asn Asp Asp Glu Val Leu Ile Glu Val Asn Pro Pro Phe
                645                 650                 655

Gly Asp Ser Tyr Ile Ile Val Gly Thr Gly Asp Ser Arg Leu Thr Tyr
                660                 665                 670

Gln Trp His Lys Glu Gly Ser Ser Ile Gly Lys Leu Phe Thr Gln Thr
                675                 680                 685

Met Lys Gly Ala Glu Arg Leu Ala Val Met Gly Asp Ala Ala Trp Asp
                690                 695                 700

Phe Ser Ser Ala Gly Gly Phe Phe Thr Ser Val Gly Lys Gly Ile His
705                 710                 715                 720
```

```
Thr Val Phe Gly Ser Ala Phe Gln Gly Leu Phe Gly Gly Leu Ser Trp
            725                 730                 735
Ile Thr Lys Val Ile Met Gly Ala Val Leu Ile Trp Val Gly Ile Asn
        740                 745                 750
Thr Arg Asn Met Thr Met Ser Met Ser Met Ile Leu Val Gly Val Ile
        755                 760                 765
Met Met Phe Leu Ser Leu Gly Val Gly Ala Asp
        770                 775

<210> SEQ ID NO 6
<211> LENGTH: 2337
<212> TYPE: DNA
<213> ORGANISM: Yellow fever virus

<400> SEQUENCE: 6
```

| | | | | | |
|---|---|---|---|---|---|
| atgtccggaa | ggaaggcaca | gggaagaacc | ctgggcgtga | acatggtgcg | gagaggcgtg | 60 |
| cggtccctgt | ctaataagat | caagcagaag | acaaagcaga | tcggaaacag | gcctggacca | 120 |
| tctcgcggcg | tgcagggctt | catcttcttt | ttcctgttta | atatcctgac | cggcaagaag | 180 |
| ctgacagccc | acctgaagaa | gctgtggagg | atgctggacc | ccagacaggg | actggccgtg | 240 |
| ctgaggaagg | tgaagagggt | ggtggcaagc | ctgatgaggg | gactggcaag | caggaagagg | 300 |
| cgctccaacg | agatggccat | ggtgcctctg | ctgctgctgg | gactgctggc | cctgtctgga | 360 |
| ggagtgaccc | tggtgaggaa | gaaccgctgg | ctgctgctga | atgtgacagc | cgaggatctg | 420 |
| ggcaagacct | tcagcgtggg | cacaggcaac | tgcaccacaa | atatcctgga | ggccaagtac | 480 |
| tggtgccctg | actccatgga | gtataactgt | ccaaatctgt | ctcccagaga | ggagcctgac | 540 |
| gatatcgatt | gctggtgtta | cggcgtggag | aatgtgcggg | tggcctatgg | cagatgtgac | 600 |
| gccgtgggcc | ggtctaagag | aagccggaga | gccatcgatc | tgccaaccca | cgagaaccac | 660 |
| ggcctgaaga | ccagacagga | gaagtggatg | acaggccgga | tgggcgagag | acagctgcag | 720 |
| aagatcgaga | ggtggctggt | gcgcaacccc | ttcttcgcag | tgaccgccct | ggcaatcgca | 780 |
| tacctggtgg | gcaacaatac | cacacagagg | gtggtcatcg | ccctgctggt | gctggcagtg | 840 |
| ggaccagcat | atagcgccca | ctgcatcggc | atcaccgaca | gagatttcat | cgagggagtg | 900 |
| cacggaggaa | cctgggtgtc | cgccacactg | gagcaggaca | agtgcgtgac | cgtgatggcc | 960 |
| cccgacaagc | cttccctgga | tatctctctg | cagacagtgg | caatcgacgg | accagccgag | 1020 |
| gccagaaagg | tgtgctactc | tgccgtgctg | acccacgtga | agatcaatga | taagtgtcca | 1080 |
| agcacaggag | aggcacacct | ggcagaggag | aacgacggcg | ataatgcctg | caagaggacc | 1140 |
| tattccgacc | ggggctgggg | aaacggatgt | ggactgtttg | gcaagggctc | tatcgtggcc | 1200 |
| tgcgccaagt | tcacctgtgc | caagagcatg | tccctgtttg | aggtggatca | gacaaagatc | 1260 |
| cagtacgtga | tcagggcaca | gctgcacgtg | ggagcaaagc | aggagaactg | gaataccgac | 1320 |
| atcaagacac | tgaagttcga | tgccctgtct | ggcagccagg | aggccgagtt | accggctac | 1380 |
| ggcaaggcca | cactggagtg | ccaggtgcag | accgccgtgg | acttcggcaa | tagctatatc | 1440 |
| gccgagatgg | agaaggactc | ctggatcgtg | gatcgccagt | gggctcagga | tctgacactg | 1500 |
| ccatggcagt | ccggatctgg | aggaatctgg | agggagatgc | accacctggt | ggagtttgag | 1560 |
| ccccctcacg | cagcaaccat | cagagtgctg | gccctgggca | atcaggaggg | aagcctgaag | 1620 |
| accgccctga | caggagccat | gagggtgaca | aaggacgaga | acgataacaa | tctgtacaag | 1680 |
| ctgcacggag | gacacgtgtc | ttgcagggtg | aagctgagcg | ccctgaccct | gaagggcaca | 1740 |

-continued

```
tcttacaaaa tgtgcaccga caagatgagc ttcgtgaaga acccaaccga tacaggccac   1800
ggcacagtgg tcatgcaggt gaaggtgcca agggcgccc  cctgtaagat ccctgtgatc   1860
gtggccgacg atctgaccgc cgccgtgaat aagggcatcc tggtgaccgt gaaccccatc   1920
gcctccacaa atgacgatga ggtgctgatc gaggtgaacc cacccttttgg cgactcctac   1980 atcatcgtgg gcaccggcga ttctaggctg acatatcagt ggcacaagga gggcagctcc   2040
atcggcaagc tgttcaccca gacaatgaag ggagcagagc gcctggccgt gatgggcgac   2100
gccgcctggg attttttctag cgccggcggc ttttttcacca gcgtgggcaa gggcatccac   2160
acagtgtttg gaagcgcctt ccagggactg tttggaggac tgtcctggat caccaaagtg   2220
atcatgggcg ccgtgctgat ctgggtgggc atcaacaccc ggaatatgac aatgagcatg   2280
tccatgatcc tggtgggcgt gatcatgatg ttcctgtccc tgggcgtggg cgccgac     2337
```

<210> SEQ ID NO 7
<211> LENGTH: 1248
<212> TYPE: PRT
<213> ORGANISM: Chikungunya virus

<400> SEQUENCE: 7

```
Met Glu Phe Ile Pro Thr Gln Thr Phe Tyr Asn Arg Arg Tyr Gln Pro
 1               5                  10                  15

Arg Pro Trp Thr Pro Arg Pro Thr Ile Gln Val Ile Arg Pro Arg Pro
            20                  25                  30

Arg Pro Gln Arg Lys Ala Gly Gln Leu Ala Gln Leu Ile Ser Ala Val
        35                  40                  45

Asn Lys Leu Thr Met Arg Val Val Pro Gln Gln Lys Pro Arg Lys Asn
50                  55                  60

Arg Lys Asn Lys Lys Gln Lys Gln Lys Gln Ala Pro Arg Asn Asn
65                  70                  75                  80

Thr Asn Gln Lys Lys Gln Pro Pro Lys Lys Pro Val Gln Lys Lys
                85                  90                  95

Lys Lys Pro Gly Arg Arg Glu Arg Met Cys Met Lys Ile Glu Asn Asp
            100                 105                 110

Cys Ile Phe Glu Val Lys His Glu Gly Lys Val Thr Gly Tyr Ala Cys
        115                 120                 125

Leu Val Gly Asp Lys Val Met Lys Pro Ala His Val Lys Gly Thr Ile
    130                 135                 140

Asp Asn Ala Asp Leu Ala Lys Leu Ala Phe Lys Arg Ser Ser Lys Tyr
145                 150                 155                 160

Asp Leu Glu Cys Ala Gln Ile Pro Val His Met Lys Ser Asp Ala Ser
                165                 170                 175

Lys Phe Thr His Glu Lys Pro Glu Gly Tyr Tyr Asn Trp His His Gly
            180                 185                 190

Ala Val Gln Tyr Ser Gly Gly Arg Phe Thr Ile Pro Thr Gly Ala Gly
        195                 200                 205

Lys Pro Gly Asp Ser Gly Arg Pro Ile Phe Asp Asn Lys Gly Arg Val
    210                 215                 220

Val Ala Ile Val Leu Gly Gly Ala Asn Glu Gly Ala Arg Thr Ala Leu
225                 230                 235                 240

Ser Val Val Thr Trp Asn Lys Asp Ile Val Thr Lys Ile Thr Pro Glu
                245                 250                 255

Gly Ala Glu Glu Trp Ser Leu Ala Ile Pro Val Met Cys Leu Leu Ala
            260                 265                 270
```

```
Asn Thr Thr Phe Pro Cys Ser Arg Pro Pro Cys Thr Pro Cys Cys Tyr
            275                 280                 285

Glu Lys Glu Pro Glu Lys Thr Leu Arg Met Leu Glu Asp Asn Val Met
            290                 295                 300

Ser Pro Gly Tyr Tyr Gln Leu Leu Gln Ala Ser Leu Thr Cys Ser Pro
305                 310                 315                 320

Arg Arg Gln Arg Arg Ser Ile Lys Asp His Phe Asn Val Tyr Lys Ala
            325                 330                 335

Thr Arg Pro Tyr Leu Ala His Cys Pro Asp Cys Gly Glu Gly His Ser
            340                 345                 350

Cys His Ser Pro Val Ala Leu Glu Arg Ile Arg Asn Glu Ala Thr Asp
            355                 360                 365

Gly Thr Leu Lys Ile Gln Val Ser Leu Gln Ile Gly Ile Lys Thr Asp
    370                 375                 380

Asp Ser His Asp Trp Thr Lys Leu Arg Tyr Met Asp Asn His Met Pro
385                 390                 395                 400

Ala Asp Ala Glu Arg Ala Gly Leu Phe Val Arg Thr Ser Ala Pro Cys
            405                 410                 415

Thr Ile Thr Gly Thr Met Gly His Phe Ile Leu Ala Arg Cys Pro Lys
            420                 425                 430

Gly Glu Thr Leu Thr Val Gly Phe Thr Asp Gly Arg Lys Ile Ser His
            435                 440                 445

Ser Cys Thr His Pro Phe His His Asp Pro Pro Val Ile Gly Arg Glu
    450                 455                 460

Lys Phe His Ser Arg Pro Gln His Gly Arg Glu Leu Pro Cys Ser Thr
465                 470                 475                 480

Tyr Ala Gln Ser Thr Ala Ala Thr Ala Glu Glu Ile Glu Val His Met
            485                 490                 495

Pro Pro Asp Thr Pro Asp Arg Thr Leu Met Ser Gln Gln Ser Gly Asn
            500                 505                 510

Val Lys Ile Thr Val Asn Ser Gln Thr Val Arg Tyr Lys Cys Asn Cys
            515                 520                 525

Gly Asp Ser Ser Glu Gly Leu Thr Thr Thr Asp Lys Val Ile Asn Asn
    530                 535                 540

Cys Lys Val Asp Gln Cys His Ala Ala Val Thr Asn His Lys Lys Trp
545                 550                 555                 560

Gln Tyr Asn Ser Pro Leu Val Pro Arg Asn Ala Glu Phe Gly Asp Arg
            565                 570                 575

Lys Gly Lys Val His Ile Pro Phe Pro Leu Ala Asn Val Thr Cys Arg
            580                 585                 590

Val Pro Lys Ala Arg Asn Pro Thr Val Thr Tyr Gly Lys Asn Gln Val
            595                 600                 605

Ile Met Leu Leu Tyr Pro Asp His Pro Thr Leu Leu Ser Tyr Arg Asn
    610                 615                 620

Met Gly Glu Glu Pro Asn Tyr Gln Glu Glu Trp Val Thr His Lys Lys
625                 630                 635                 640

Glu Ile Arg Leu Thr Val Pro Thr Glu Gly Leu Glu Val Thr Trp Gly
            645                 650                 655

Asn Asn Glu Pro Tyr Lys Tyr Trp Pro Gln Leu Ser Thr Asn Gly Thr
            660                 665                 670

Ala His Gly His Pro His Glu Ile Ile Leu Tyr Tyr Tyr Glu Leu Tyr
            675                 680                 685

Pro Thr Met Thr Ala Val Val Leu Ser Val Ala Ser Phe Ile Leu Leu
```

```
                690             695             700
Ser Met Val Gly Val Ala Val Gly Met Cys Met Cys Ala Arg Arg Arg
705             710             715             720

Cys Ile Thr Pro Tyr Glu Leu Thr Pro Gly Ala Thr Val Pro Phe Leu
                725             730             735

Leu Ser Leu Ile Cys Cys Ile Arg Thr Ala Lys Ala Ala Thr Tyr Gln
                740             745             750

Glu Ala Ala Val Tyr Leu Trp Asn Glu Gln Pro Leu Phe Trp Met
            755             760             765

Gln Ala Leu Ile Pro Leu Ala Ala Leu Ile Val Leu Cys Asn Cys Leu
        770             775             780

Arg Leu Leu Pro Cys Cys Cys Lys Met Leu Thr Phe Leu Ala Val Leu
785             790             795             800

Ser Val Gly Ala His Thr Val Ser Ala Tyr Glu His Val Thr Val Ile
                805             810             815

Pro Asn Thr Val Gly Val Pro Tyr Lys Thr Leu Val Asn Arg Pro Gly
            820             825             830

Tyr Ser Pro Met Val Leu Glu Met Glu Leu Leu Ser Val Thr Leu Glu
        835             840             845

Pro Thr Leu Ser Leu Asp Tyr Ile Thr Cys Glu Tyr Lys Thr Val Ile
850             855             860

Pro Ser Pro Tyr Val Lys Cys Cys Gly Thr Ala Glu Cys Lys Asp Lys
865             870             875             880

Ser Leu Pro Asp Tyr Ser Cys Lys Val Phe Thr Gly Val Tyr Pro Phe
                885             890             895

Met Trp Gly Gly Ala Tyr Cys Phe Cys Asp Thr Glu Asn Thr Gln Leu
            900             905             910

Ser Glu Ala His Val Glu Lys Ser Glu Ser Cys Lys Thr Glu Phe Ala
        915             920             925

Ser Ala Tyr Arg Ala His Thr Ala Ser Ala Ser Ala Lys Leu Arg Val
        930             935             940

Leu Tyr Gln Gly Asn Asn Ile Thr Val Ala Ala Tyr Ala Asn Gly Asp
945             950             955             960

His Ala Val Thr Val Lys Asp Ala Lys Phe Ile Val Gly Pro Met Ser
                965             970             975

Ser Ala Trp Thr Pro Phe Asp Asn Lys Ile Val Tyr Lys Gly Asp
            980             985             990

Val Tyr Asn Met Asp Tyr Pro Pro Phe Gly Ala Gly Arg Pro Gly Gln
        995             1000            1005

Phe Gly Asp Ile Gln Ser Arg Thr Pro Glu Ser Glu Asp Val Tyr
    1010            1015            1020

Ala Asn Thr Gln Leu Val Leu Gln Arg Pro Ser Ala Gly Thr Val
    1025            1030            1035

His Val Pro Tyr Ser Gln Ala Pro Ser Gly Phe Lys Tyr Trp Leu
    1040            1045            1050

Lys Glu Arg Gly Ala Ser Leu Gln His Thr Ala Pro Phe Gly Cys
    1055            1060            1065

Gln Ile Ala Thr Asn Pro Val Arg Ala Met Asn Cys Ala Val Gly
    1070            1075            1080

Asn Met Pro Ile Ser Ile Asp Ile Pro Asp Ala Ala Phe Thr Arg
    1085            1090            1095

Val Val Asp Ala Pro Ser Leu Thr Asp Met Ser Cys Glu Val Ser
    1100            1105            1110
```

```
Ala Cys Thr His Ser Ser Asp Phe Gly Gly Val Ala Ile Ile Lys
    1115            1120                1125

Tyr Ala Ala Ser Lys Lys Gly Lys Cys Ala Val His Ser Met Thr
        1130            1135                1140

Asn Ala Val Thr Ile Arg Glu Ala Glu Ile Glu Val Glu Gly Asn
    1145                1150                1155

Ser Gln Leu Gln Ile Ser Phe Ser Thr Ala Leu Ala Ser Ala Glu
    1160                1165                1170

Phe Arg Val Gln Val Cys Ser Thr Gln Val His Cys Ala Ala Glu
    1175                1180                1185

Cys His Pro Pro Lys Asp His Ile Val Asn Tyr Pro Ala Ser His
    1190                1195                1200

Thr Thr Leu Gly Val Gln Asp Ile Ser Ala Thr Ala Met Ser Trp
    1205                1210                1215

Val Gln Lys Ile Thr Gly Gly Val Gly Leu Val Val Ala Val Ala
    1220                1225                1230

Ala Leu Ile Leu Ile Val Val Leu Cys Val Ser Phe Ser Arg His
    1235                1240                1245

<210> SEQ ID NO 8
<211> LENGTH: 3744
<212> TYPE: DNA
<213> ORGANISM: Chikungunya virus

<400> SEQUENCE: 8
atggagttca tccccacaca gacctttat  aaccggagat accagcccag gccttggacc      60
ccacgcccaa caatccaggt catcaggcct cggccaagac acagaggaa  ggcaggacag     120 ctggcacagc tgatcagcgc cgtgaataag ctgaccatgc gcgtggtgcc ccagcagaag     180
cctcggaaga acagaaagaa taagaagcag aagcagaagc agcaggcccc aaggaacaat     240
accaaccaga gaagcagcc  cccaagaag  aagcctgtgc agaagaagaa gaagccaggc     300
aggcgcgagc gcatgtgcat gaagatcgag atgattgca  tcttcgaggt gaagcacgag     360
ggcaaggtga ccggctacgc ctgtctggtg ggcgacaaag tgatgaagcc cgcccacgtg     420
aagggcacaa tcgacaacgc cgatctggcc aagctggcct tcaagaggag ctccaagtat     480
gatctggagt gcgcccagat ccccgtgcac atgaagagcg acgcctccaa gtttacccac     540
gagaagcctg agggctacta taattggcac cacggagcag tgcagtactc tggaggcagg     600
ttcaccatcc ctacaggagc aggcaagcca ggcgacagcg cagaccccat ctttgataat     660
aagggaagag tggtggcaat cgtgctggga ggagcaaacg agggcgccag aaccgccctg     720
agcgtggtga catggaataa ggatatcgtg accaagatca cacctgaggg agcagaggag     780
tggtctctgg caatcccagt gatgtgcctg ctggccaaca ccacattccc atgtagccgg     840
ccaccatgca ccccatgctg ttacgagaaa gagcctgaga gacactgag  aatgctggag     900 gacaatgtga tgtcccctgg ctactatcag ctgctgcagg cctctctgac ctgtagccca     960
cggagacaga ggcgctctat caaggatcac tttaacgtgt ataaggccac aaggccttac    1020
ctggcacact gtccagactg cggagaggga cactcttgcc acagcccagt ggccctggag    1080
cggatcagaa atgaggccac cgatggcaca ctgaagatcc aggtgagcct gcagatcggc    1140
atcaagaccg acgattccca cgactggaca aagctgcgct acatggacaa ccacatgcca    1200
gccgatgcag agagggcagg actgttcgtg agaaccagcg ccccctgtac aatcaccggc    1260
acaatgggcc acttcatcct ggcaaggtgc ccaaagggag agaccctgac agtgggcttt    1320
```

```
accgatggcc gcaagatctc tcacagctgt acacaccctt tccaccacga ccctccagtg   1380
atcggccgcg agaagtttca ctcccggcca cagcacggaa gagagctgcc ctgctctacc   1440
tatgcacaga gcaccgccgc cacagccgag gagatcgagg tgcacatgcc ccctgacacc   1500
cccgatcgga cactgatgtc ccagcagtct ggcaacgtga agatcaccgt gaatagccag   1560
acagtgagat acaagtgtaa ctgcggcgac tctagcgagg gcctgaccac aaccgataaa   1620
gtgatcaaca attgtaaggt ggaccagtgc cacgccgccg tgaccaacca caagaagtgg   1680
cagtataatt ccccactggt gcccaggaac gccgagttcg gcgatcgcaa gggcaaggtg   1740
cacatccctt ttccactggc caatgtgacc tgcagggtgc ctaaggcccg caatccaacc   1800
gtgacatacg gcaagaacca ggtcatcatg ctgctgtatc ctgaccaccc aacactgctg   1860
agctacagga acatgggcga ggagcctaat tatcaggagg agtgggtgac ccacaagaag   1920
gagatccgcc tgaccgtgcc aacagagggc ctggaggtga catgggcaa caatgagccc   1980 tataagtact ggcctcagct gtccaccaac ggaacagcac acggacaccc acacgagatc   2040
atcctgtact attacgagct gtaccctacc atgacagccg tggtgctgag cgtggcctcc   2100
ttcatcctgc tgtccatggt gggagtggca gtgggaatgt gcatgtgcgc acggagaagg   2160
tgcatcaccc catatgagct gacccccggc gccacagtgc ctttctgct gtctctgatc   2220 tgctgtatcc ggaccgccaa ggccgccaca tatcaggagg ccgccgtgta cctgtggaac   2280
gagcagcagc ccctgttctg gatgcaggcc ctgatccctc tggccgccct gatcgtgctg   2340
tgcaattgcc tgagactgct gccttgctgt tgcaagatgc tgacctttct ggccgtgctg   2400
tccgtgggcg cccacacagt gtctgcctac gagcacgtga ccgtgatccc caatacagtg   2460
ggcgtgcctt acaagaccct ggtgaaccgg ccaggctatt ctcccatggt gctggagatg   2520
gagctgctga gcgtgaccct ggagccaaca ctgtccctgg attatatcac ctgtgagtac   2580
aagacagtga tccccagccc ttacgtgaag tgttgcggca ccgccgagtg taaggacaag   2640
tccctgccag attattcttg caaggtgttc acaggcgtgt atcctttat gtggggcggc   2700 gcctactgtt tctgcgacac cgagaacaca cagctgtccg aggcccacgt ggagaagtcc   2760
gagtcttgca agaccgagtt tgcctctgcc tacagagccc acacagcaag cgcctccgcc   2820
aagctgagag tgctgtacca gggcaacaat atcaccgtgg ccgcctatgc caatggcgac   2880
cacgccgtga cagtgaagga tgccaagttc atcgtgggac ccatgtcctc tgcctggacc   2940
ccatttgaca taagatcgt ggtgtacaag ggcgacgtgt ataacatgga ttacccaccc   3000
ttcggcgcag gcaggcctgg acagtttggc gatatccaga gccgcacccc agagtccgag   3060
gacgtgtatg ccaacacaca gctggtgctg cagaggccaa gcgccggcac cgtgcacgtg   3120
ccatactccc aggccccctc tggcttcaag tattggctga aggagagggg agcatccctg   3180
cagcacaccg caccatttgg ctgtcagatc gccacaaatc ccgtgagagc catgaactgc   3240
gccgtgggca atatgccaat cagcatcgac atccccgatg ccgccttcac cagagtggtg   3300 gacgccccttt ccctgacaga tatgagctgt gaggtgtccg cctgcaccca cagctccgac   3360
tttggcggcg tggccatcat caagtacgcc gcctctaaga agggcaagtg tgccgtgcac   3420
agcatgacca acgccgtgac aatccgggag gccgagatcg aggtggaggg caatagccag   3480
ctgcagatct cttttcagcac cgccctggcc tccgccgagt ttagagtgca ggtgtgctct   3540
acacaggtgc actgtgccgc cgagtgccac cctccaaagg atcacatcgt gaactatcca   3600
gcatcccaca caaccctggg agtgcaggac atctctgcca ccgccatgag ctgggtgcag   3660
```

-continued

```
aagatcacag gaggagtggg actggtggtg gcagtggccg ccctgatcct gatcgtggtg    3720
ctgtgcgtgt ccttctctag acac                                          3744
```